(12) United States Patent
Ambrosetti et al.

(10) Patent No.: US 12,123,628 B2
(45) Date of Patent: Oct. 22, 2024

(54) METHOD FOR OPERATING A RECEIVER AND RECEIVER FOR CARRYING OUT THE METHOD

(71) Applicants: Synhelion SA, Lugano (CH); ENI S.P.A., Rome (IT)

(72) Inventors: Gianluca Ambrosetti, Gintilino (CH); Philipp Good, Zürich (CH)

(73) Assignees: Synhelion SA, Lugano (CH); ENI S.P.A., Rome (IT)

( * ) Notice: Subject to any disclaimer, the term of this patent is extended or adjusted under 35 U.S.C. 154(b) by 461 days.

(21) Appl. No.: 17/291,665

(22) PCT Filed: Nov. 7, 2019

(86) PCT No.: PCT/CH2019/050025
§ 371 (c)(1),
(2) Date: May 6, 2021

(87) PCT Pub. No.: WO2020/093179
PCT Pub. Date: May 14, 2020

(65) Prior Publication Data
US 2022/0003458 A1    Jan. 6, 2022

(30) Foreign Application Priority Data
Nov. 8, 2018   (CH) .................................. 1377/18

(51) Int. Cl.
*F24S 20/20*     (2018.01)
*F24S 10/80*     (2018.01)
*F24S 70/60*     (2018.01)

(52) U.S. Cl.
CPC ............... *F24S 70/60* (2018.05); *F24S 10/80* (2018.05); *F24S 20/20* (2018.05)

(58) Field of Classification Search
CPC ............. F24S 70/60; F24S 20/20; F24S 10/80
(Continued)

(56) References Cited

U.S. PATENT DOCUMENTS

| | | |
|---|---|---|
| 3,604,400 A | 9/1971 | Sharan |
| 4,033,118 A | 7/1977 | Powell |

(Continued)

FOREIGN PATENT DOCUMENTS

| | | |
|---|---|---|
| CN | 103392100 | 11/2013 |
| CN | 205337423 | 6/2016 |

(Continued)

OTHER PUBLICATIONS

Delval, Stéphane; International Search Report for PCT/CH2019/050025; Feb. 13, 2020; 4 pages.
(Continued)

*Primary Examiner* — Avinash A Savani
(74) *Attorney, Agent, or Firm* — Henry Patent Law Firm PLLC

(57) ABSTRACT

The receiver (25,50,100,120) according to the invention is provided with the heating area (26) for heating a heat-transporting medium, which has an optical opening (3) for sunlight, an absorber (27, 51) absorbing the sunlight arranged within the path of the incidental sunlight and with a transport arrangement for the transport of the medium through the heating area, wherein the absorber (27, 52) is designed as a blackbody radiation arrangement with reduced convection and the transport arrangement (29) for the transport of a gas is designed as a heat-transporting medium. By means of this, the receiver can be designed in a simpler and more reliable manner.

34 Claims, 14 Drawing Sheets

Figure 1A:
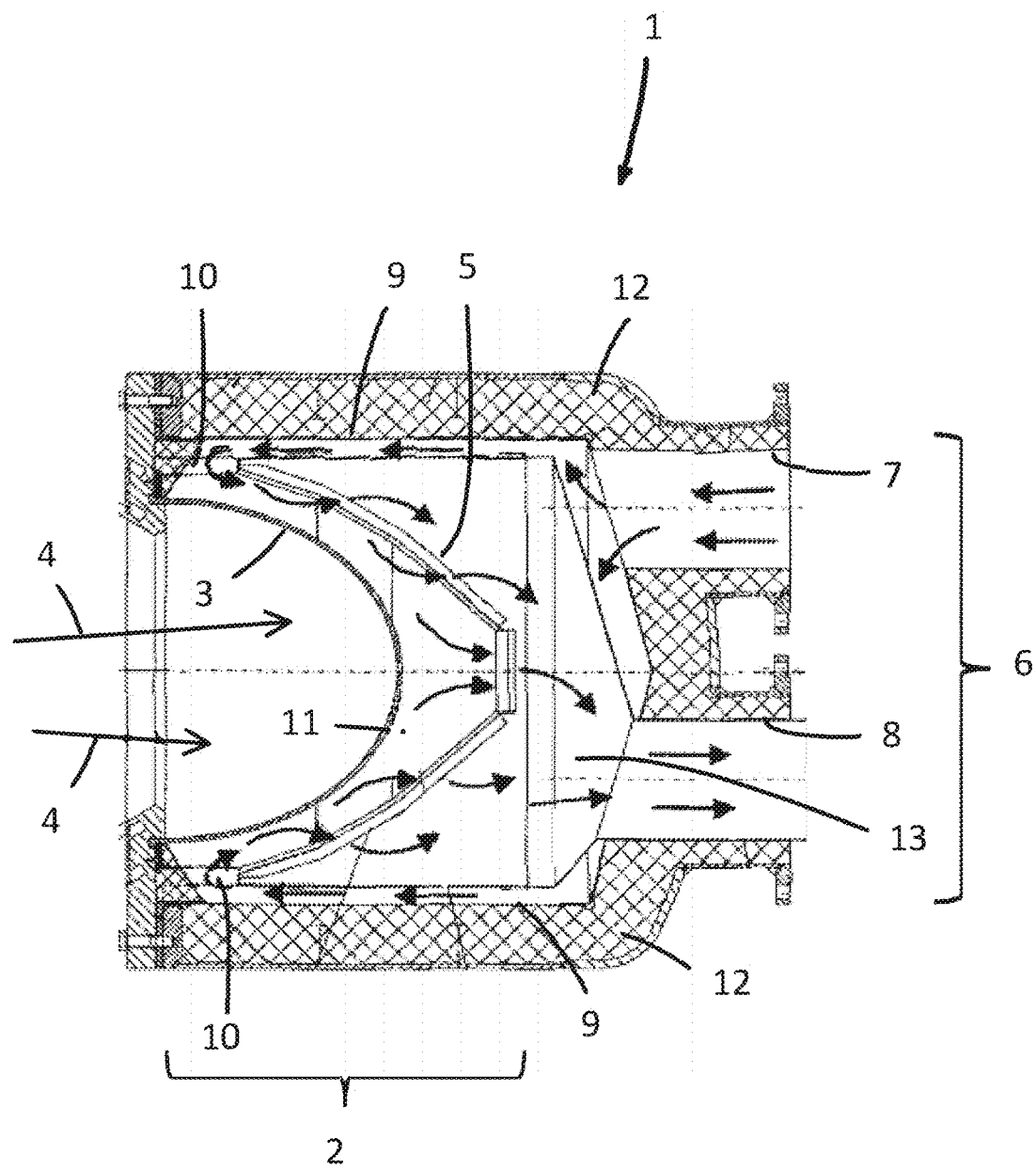

(58) Field of Classification Search
USPC .......................................... 126/569; 60/641.5
See application file for complete search history.

(56) References Cited

U.S. PATENT DOCUMENTS

| | | | |
|---|---|---|---|
| 4,263,895 | A | 4/1981 | Colao |
| 4,455,153 | A | 6/1984 | Jakahi |
| 4,945,731 | A * | 8/1990 | Parker .................... F03G 6/064 |
| | | | 60/659 |
| 5,931,158 | A | 8/1999 | Buck |
| 7,140,181 | B1 | 11/2006 | Jensen et al. |
| 8,378,280 | B2 | 2/2013 | Mills et al. |
| 9,869,302 | B2 | 1/2018 | Hischier et al. |
| 2002/0083946 | A1 | 7/2002 | Karni et al. |
| 2011/0220095 | A1 | 9/2011 | Van Der Graaf |
| 2013/0291541 | A1 | 11/2013 | Hischier et al. |
| 2015/0033740 | A1 | 2/2015 | Anderson et al. |
| 2017/0038096 | A1* | 2/2017 | Hilliard .................. F24S 80/50 |
| 2022/0090825 | A1 | 3/2022 | Ambrosetti et al. |

FOREIGN PATENT DOCUMENTS

| | | |
|---|---|---|
| DE | 3743798 | 7/1989 |
| EP | 1052461 | 11/2000 |
| EP | 1610073 A2 | 12/2005 |
| EP | 2329202 | 12/2014 |
| FR | 2381967 | 9/1978 |
| GB | 887202 | 1/1962 |
| NL | 7703915 | 10/1977 |
| WO | 2001061254 | 8/2001 |
| WO | WO2004027098 | 4/2004 |
| WO | 2016171164 | 10/2016 |
| WO | 2018205043 | 11/2018 |
| WO | WO 2018/205043 A1 | 11/2018 |

OTHER PUBLICATIONS

R. Buck, et al., Receiver for Solar-Hybrid Gas Turbine and Combined Cycle Systems, Journal de Physique IV France, 9 (1999).
USPTO, Notice of Allowance issued in U.S. Appl. No. 16/609,147 on Dec. 8, 2023, 10 pages.
USPTO, Notice of Allowance issued in U.S. Appl. No. 16/609,147 on Jun. 22, 2023, 10 pages.
USPTO, Final Office Action mailed Nov. 4, 2022, in U.S. Appl. No. 16/609,147, 26 pgs.
USPTO, Non-final Office Action mailed Apr. 15, 2022, in U.S. Appl. No. 16/609,147, 36 pgs.
Chen, Wen-Xiu, "Industrial Furnace", Central South University of Technology Press, Feb. 1992, pp. 105-110 (machine translation), 9 pages.
He, Yong-Mei, "Modern Continuous Heating Furnace", Metallurgical Industry Press, Chapter 2, Dec. 1981, pp. 238-255 (machine translation), 5 pages.

* cited by examiner

METHOD FOR OPERATING A RECEIVER AND RECEIVER FOR CARRYING OUT THE METHOD

The present invention relates to a method to operate a receiver and a receiver to carry out the method, as well as a production method for a receiver.

Receivers are used in solar power plants. They collect the concentrated solar radiation and, by means of this, they heat a heat-transporting medium, via which the acquired heat is utilised in a subsequent technical process, whether this be via the conversion into mechanical power, for example, by propelling turbines, for carrying out processes requiring heat in the field of industry or for heating, for example, the district heating of inhabited areas.

In solar tower power plants, primarily receivers designed as pipe bundles are used, which are suitable for temperatures of up to 600° C. and sunlight concentrations of 600. For higher temperatures, primarily spatially designed receivers are used, which are designed for sunlight concentrations of 600, 1000 or more. Such temperatures are generally over 600° C., reaching 800° C. to 1000° C. and more, and, in the near future, will be able to reach a range of 1200° C. to 1500° C. Such receivers can, however on a smaller scale, also be used for dish concentrators. In the present document, receivers are referred to as spatial receivers if their dimensions are comparably large in all three dimensions in contrast to pipe-shaped receivers that are used in connection with trough or trough collectors. Such pipe-shaped receivers possess one dimension; namely length, which is a great deal more, at a range of the ten times or one hundred times more, than the cross-section dimensions width and height. Receivers for trough collectors are not designed for the aforementioned temperatures since the channel-shaped concentrator concentrates in two dimensions with reference to the receiver, however, the field of heliostats in three dimensions in the case of a tower power plant or a dish concentrator.

Such receivers are known to the person skilled in the art as volumetric receivers, which are also suitable for solar tower power plants, wherein, in such receivers, the required temperatures can reach more than 500° C., or more than 1000° C., for example, up to 1200° C. However, the high operating temperatures lead to considerable effort on a constructional level.

Volumetric receivers possess an extended (voluminous, therefore the term "volumetric" receiver) absorber structure, which, for example, can be composed of a voluminous wire mesh or an open-porous ceramic foam. The concentrated solar radiation then penetrates into the interior space of the (voluminous) absorber structure and is absorbed there. The heat-transporting medium, such as air or a suitable reactant for a subsequent reactor is led through the open-porous absorber structure and, in this way, absorbs by means of forced convection at the open-porous absorber structure. The absorber structure can also consist of a pipe structure, a graduated lattice structure or any structure in itself with a large surface, which causes the heat transfer from the absorber structure to the heat-transporting medium, if this flows through the absorber.

For example, a volumetric receiver became known due to the REFOS project (Receiver for solar-hybrid gas turbine and combined cycle systems; R. Buck, M. Abele, J. Kunberger, T. Denk, P. Heller and E. Lúpfert, in Journal de Physique IV France 9 (1999)), which will be described in more detail below in conjunction with FIG. 1.

Such receivers have the disadvantage that the absorber structure is complicated to manufacture and the flow running through the absorber may become instable, in particular, due to an undesired temperature distribution occurring during operation.

Accordingly, it is the object of the present invention to create an improved receiver.

By means of the fact that, according to the method according to the invention, the selected heat-transporting gas is absorptive within the frequency bands belonging to the infrared range and the operating parameters are configured in such a way that a substantial part of the heat increase occurs due to the absorption in the heat-transporting gas, a simplified concept of the receiver can be implemented since the heat transfer only takes place at a reduced level due to convection.

By means of the fact that the absorption arrangement is designed as a blackbody radiation arrangement with reduced convection, the design of the absorber is simplified and thereby the construction and operation of the receiver is too since the absorber no longer must emit the heat introduced via the solar radiation in an absorptive manner across its depth to the heat-transporting gas.

The invention is explained in more detail below based on the figures.

Figure 1B:
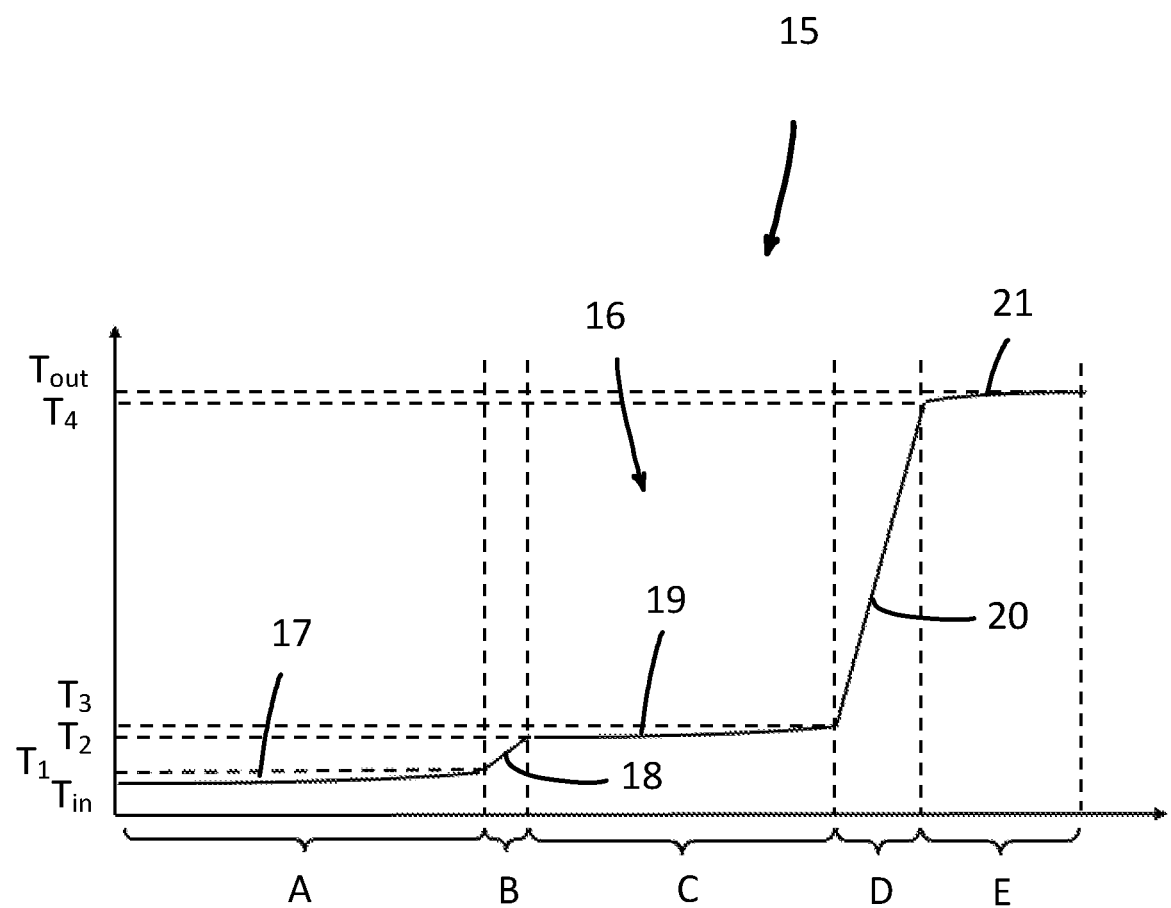
Figure 2:
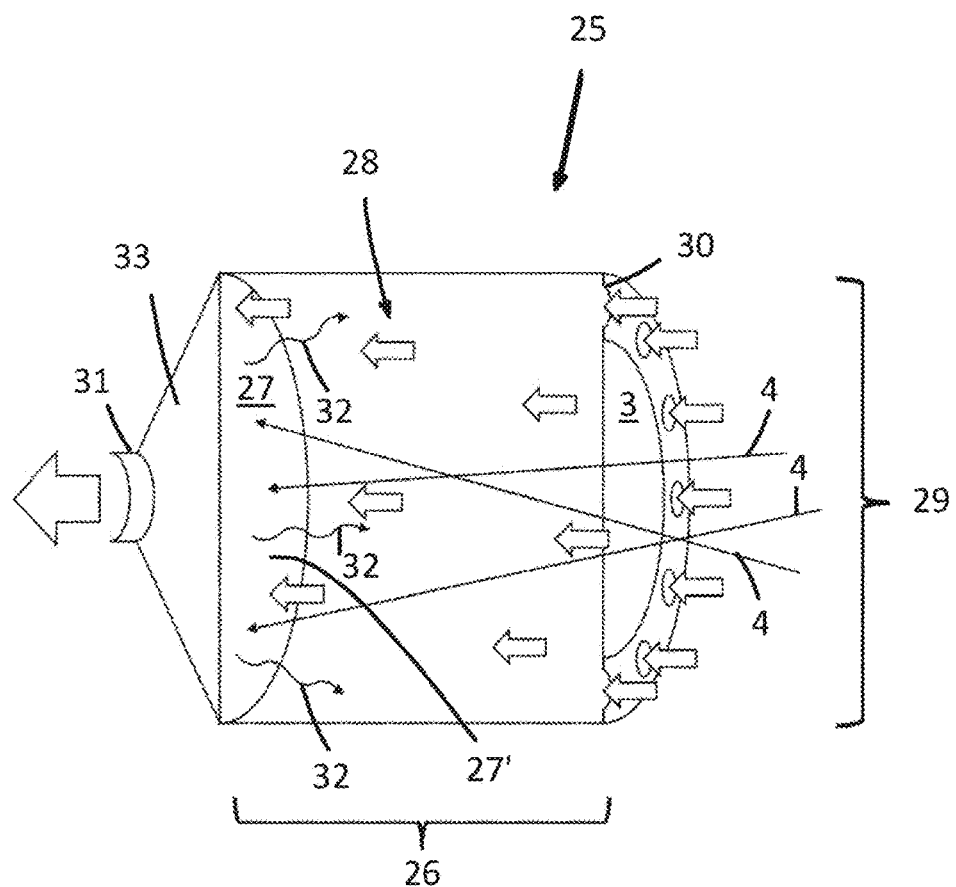
Figure 3:
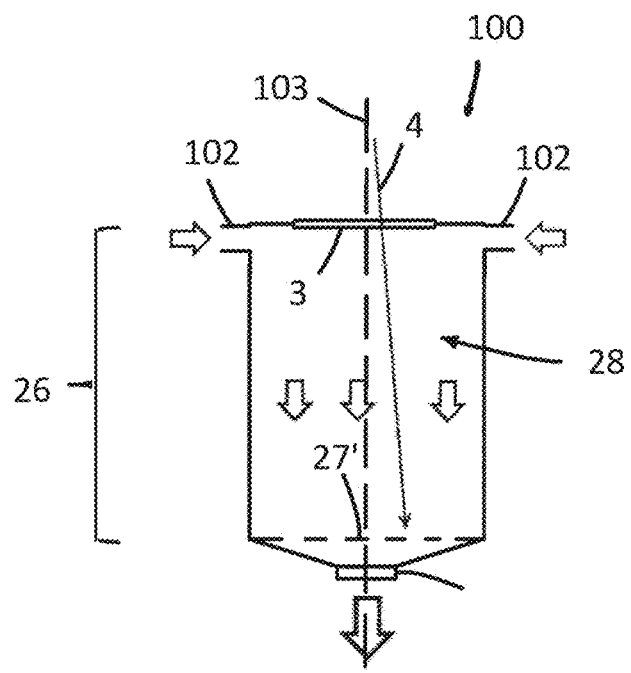
Figure 4:
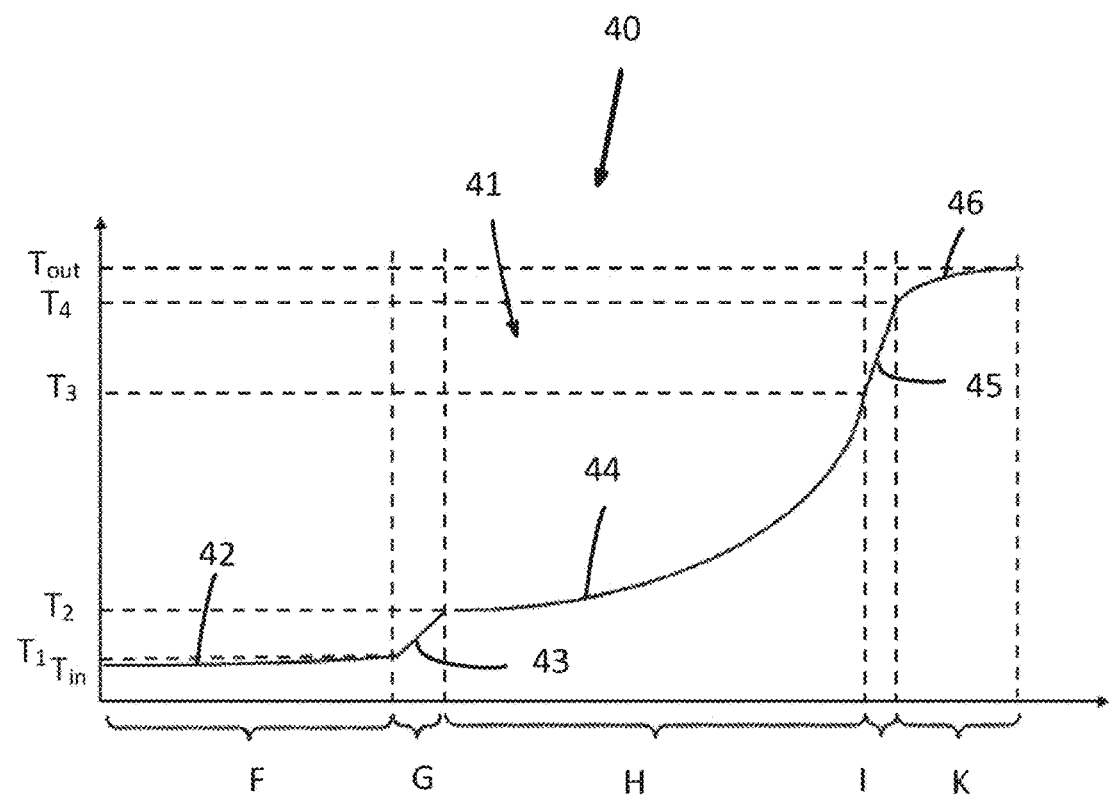
Figure 5:
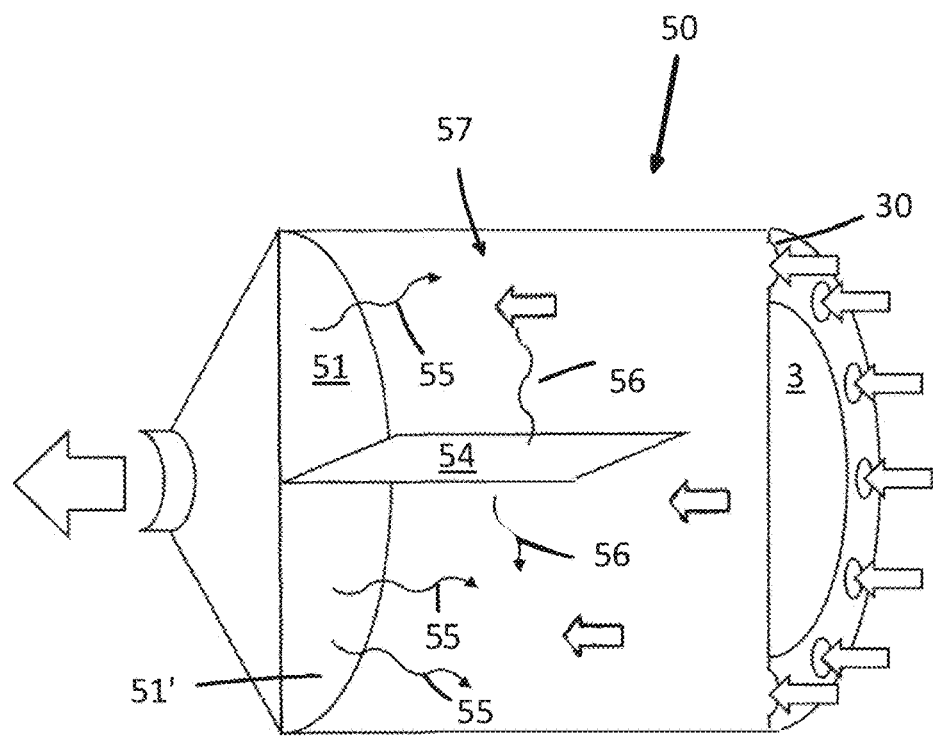
Figure 6:
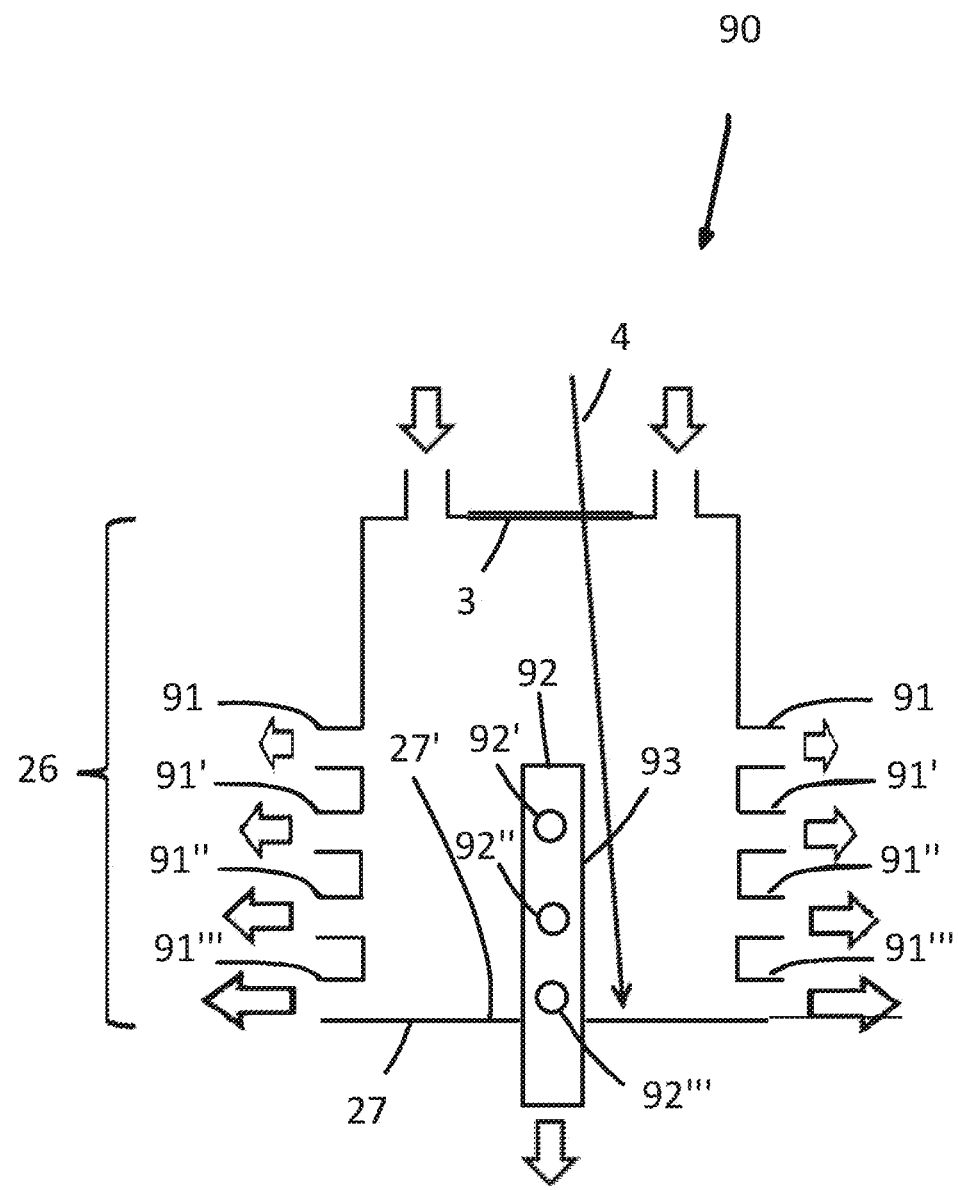
Figure 7A:
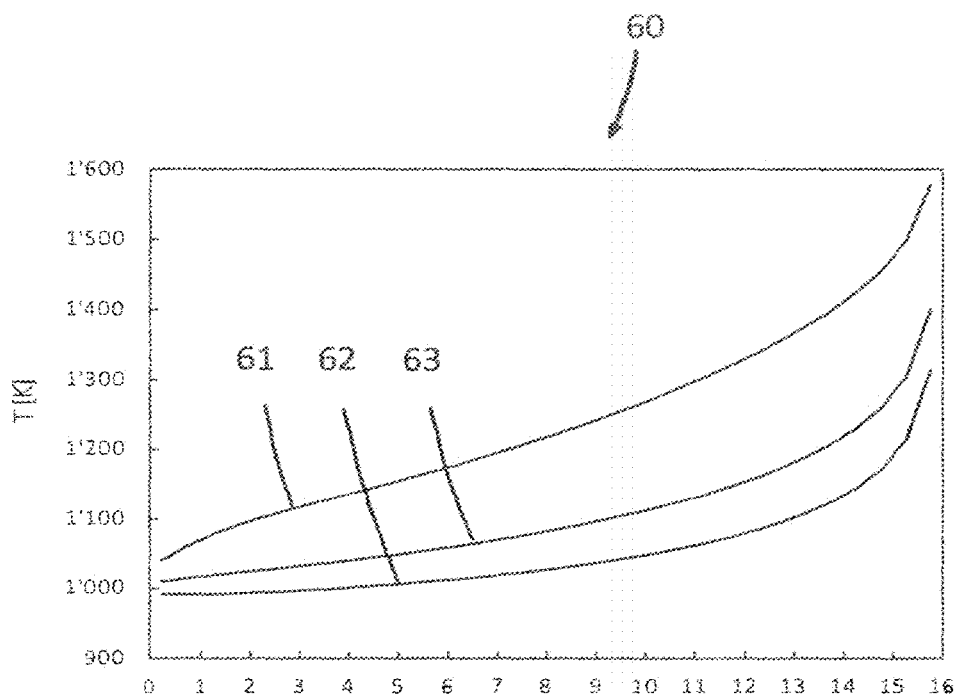
Figure 7B:
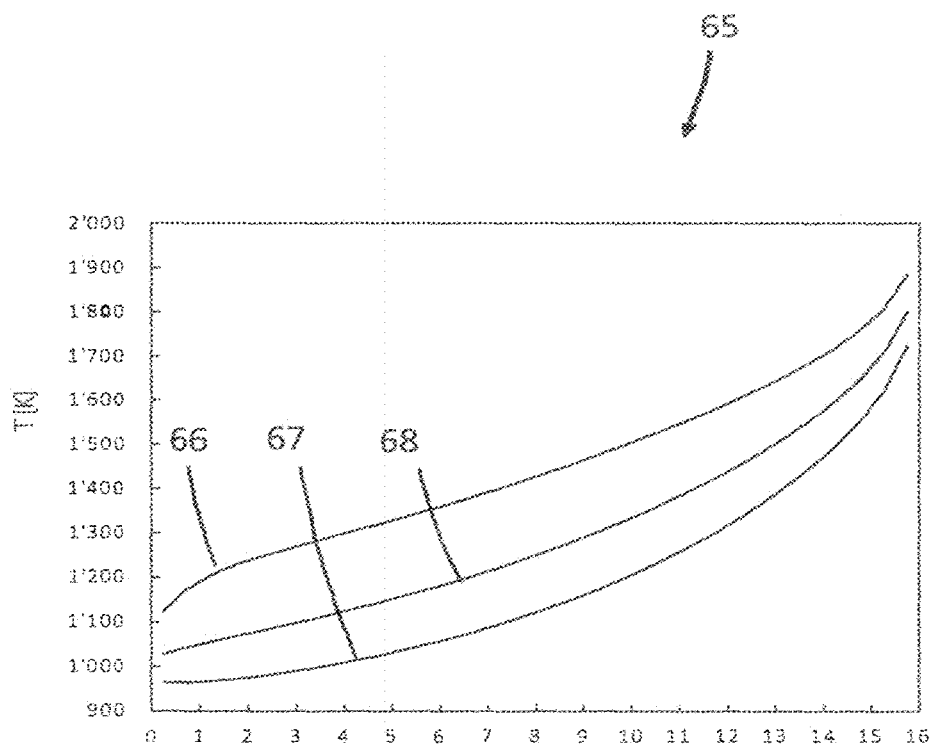

The figures show:

FIG. 1a a receiver according to the most recent background art,

FIG. 1b schematically, a diagram with the temperature profile in the receiver of FIG. 1a, FIG. 2 schematically, a receiver according to the present invention in a longitudinal section, FIG. 3 schematically, another embodiment of the receiver according to the invention, FIG. 4 schematically, a diagram with the temperature profile in the receiver from FIG. 2, FIG. 5 schematically, another embodiment of the receiver according to the invention, FIG. 6 schematically, a cross-section through yet another embodiment of the receiver according to the invention, FIGS. 7a and 7b diagrams with the temperature profile in a receiver according to the invention in accordance with FIGS. 2 and 3, FIG. 8a to c diagrams with the degree of efficiency as well as the temperature of the absorbing surface in a receiver according to the invention in accordance with FIGS. 2 and 3.

Figure 9:
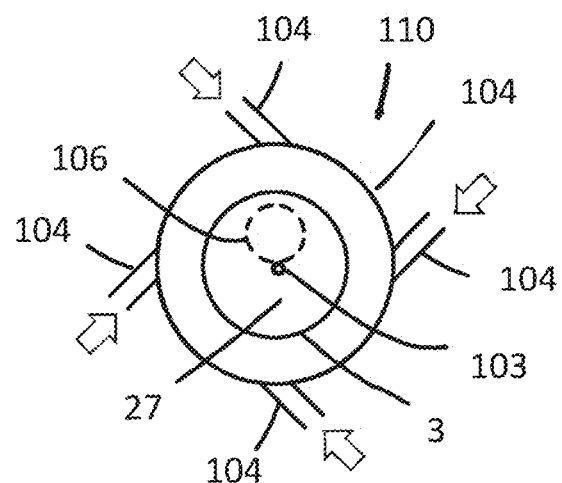
Figure 10:
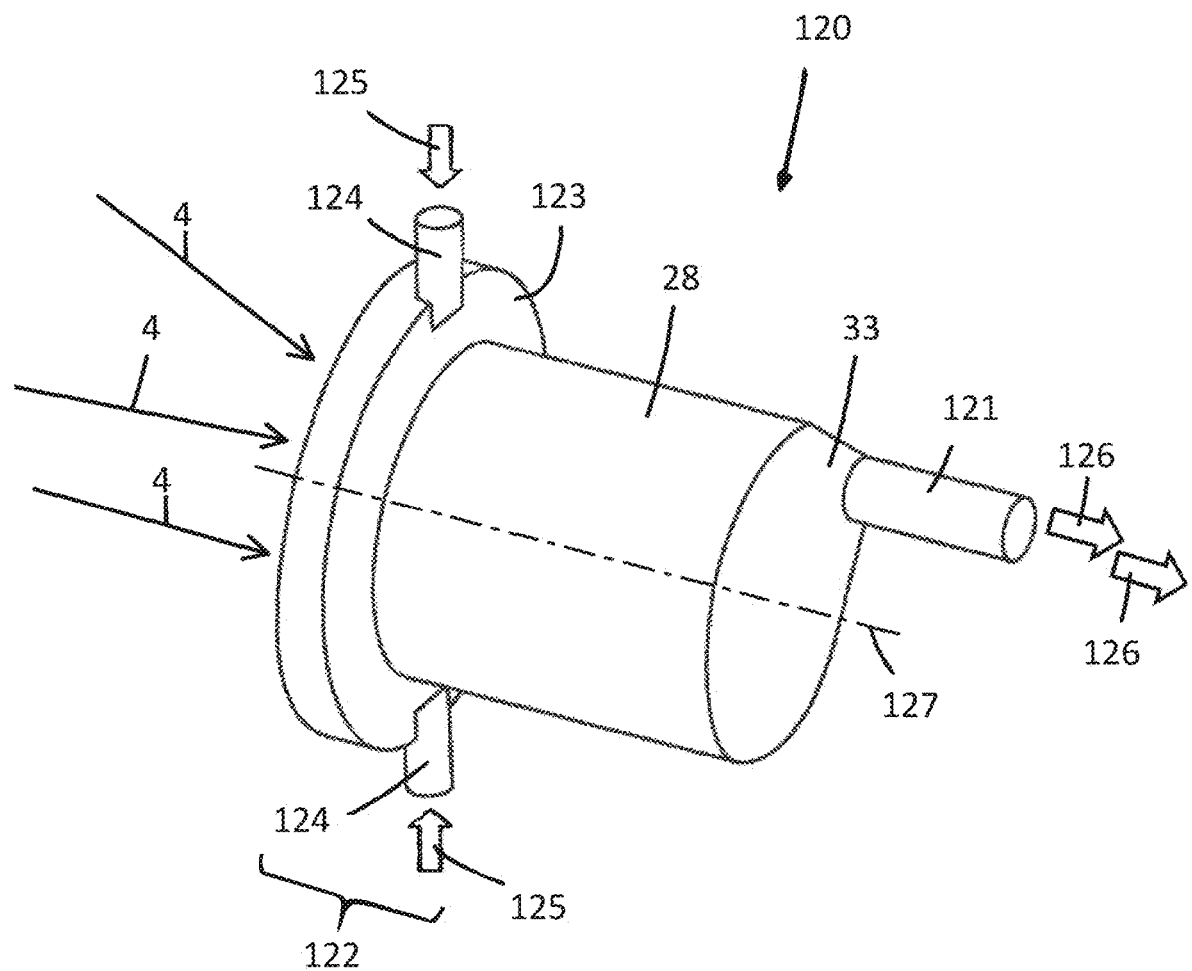
Figure 11A:
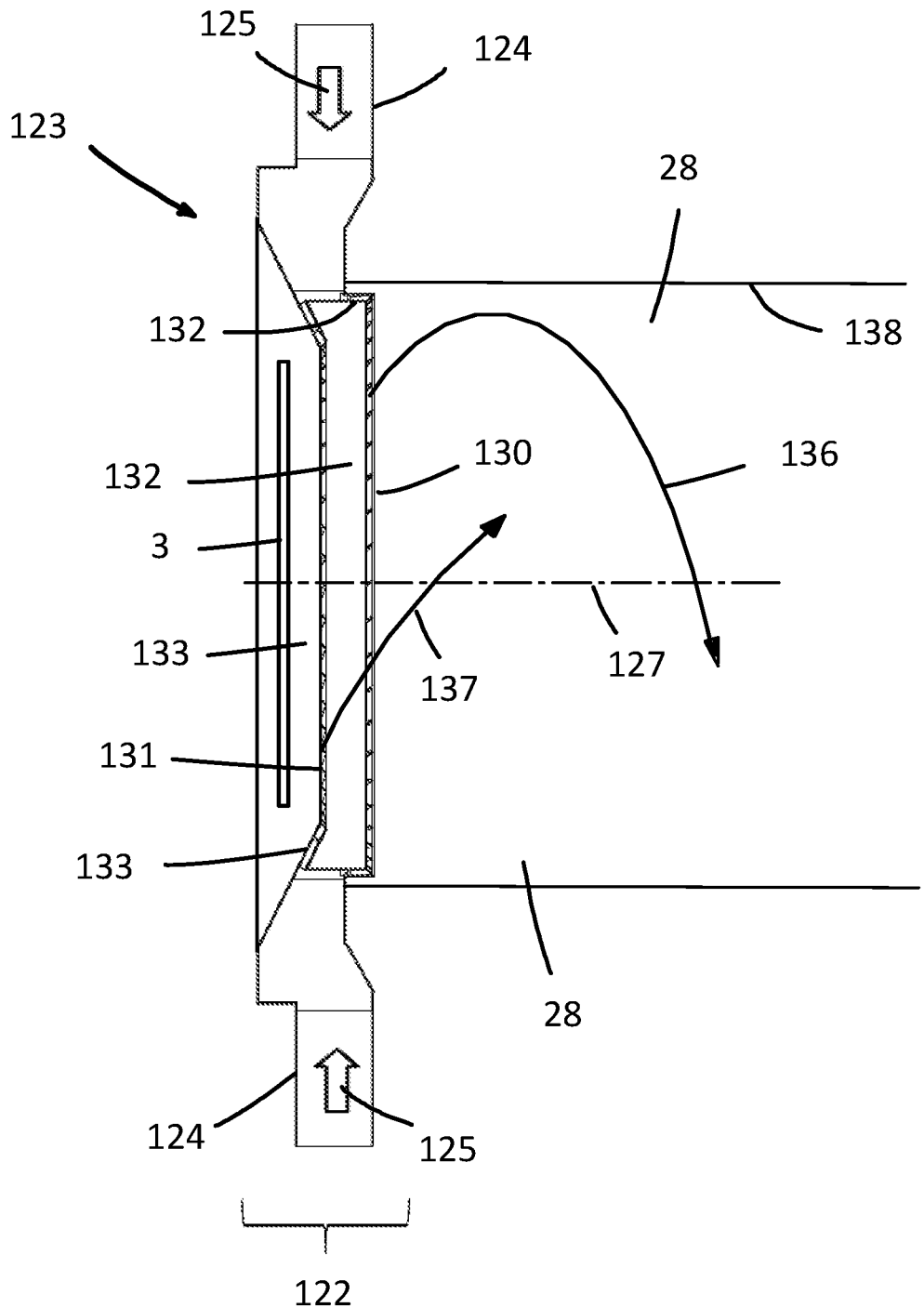
Figure 11:
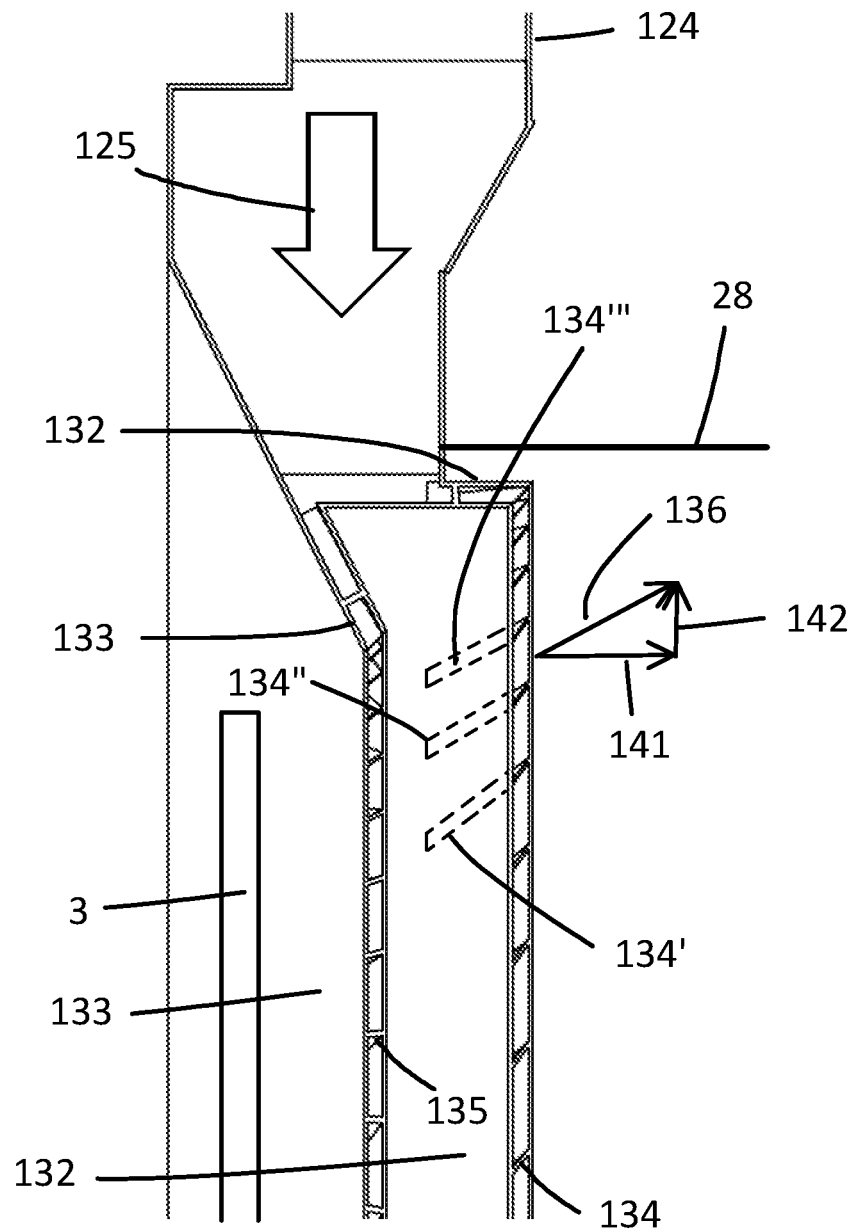
Figure 12:
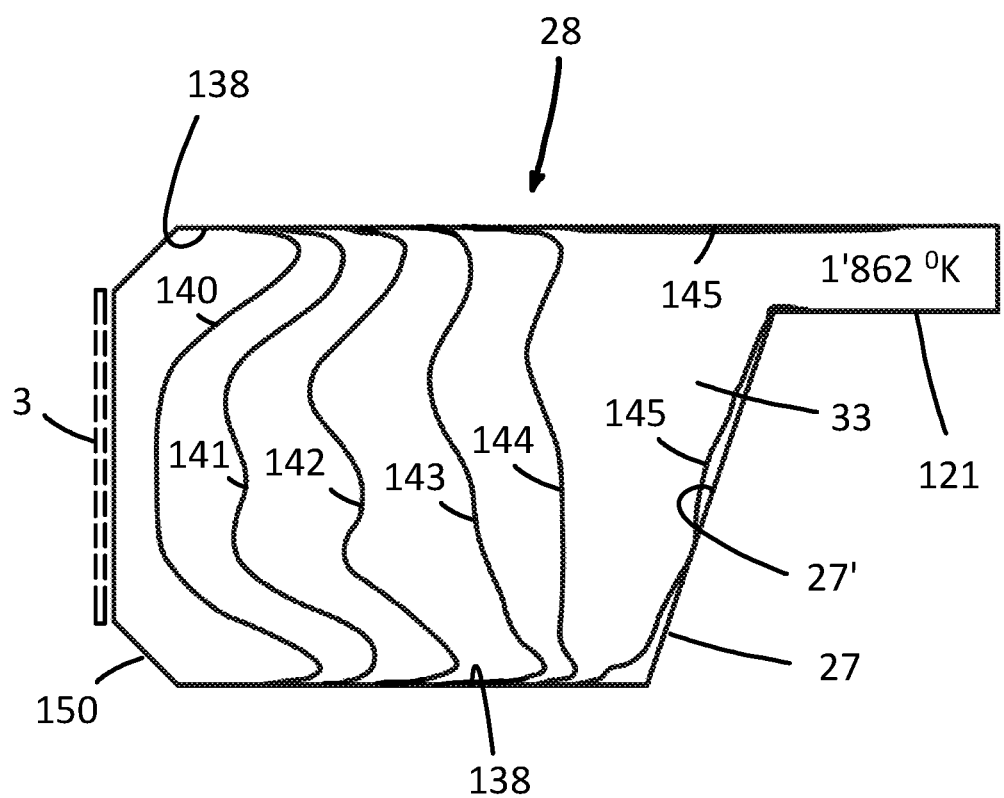
Figure 13:
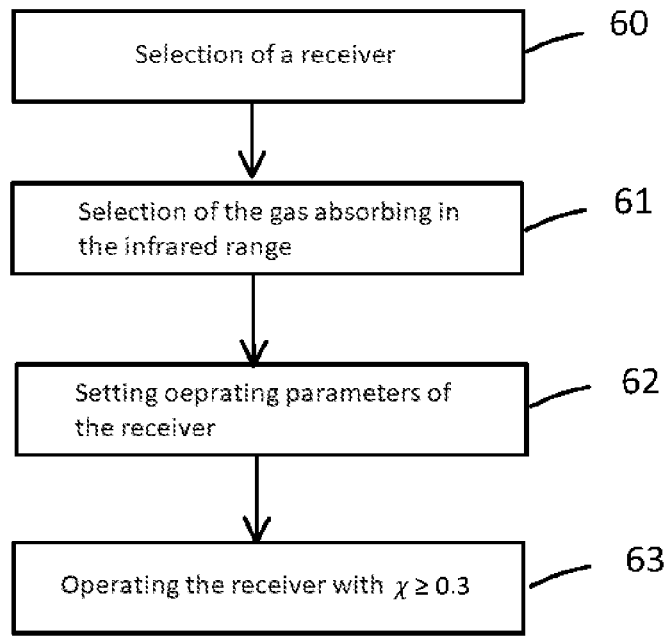
Figure 14:
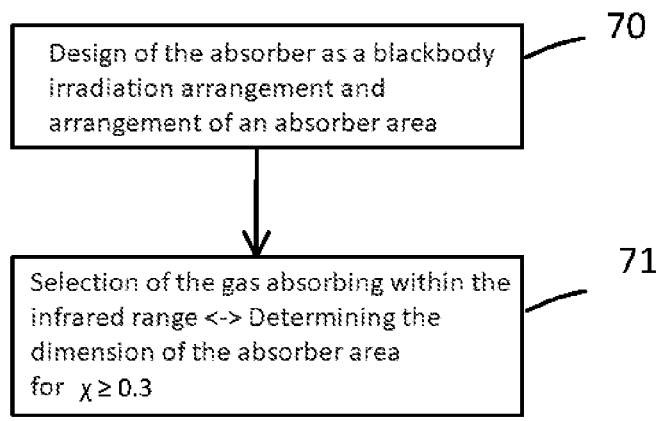

FIG. 9 schematically, another embodiment of the receiver according to the invention, FIG. 10 schematically, a view of another embodiment of the receiver according to the invention in a horizontal operating position, FIG. 11a a section through the annular space of the receiver from FIG. 10, FIG. 11b an enlarged section from FIG. 11a, FIG. 12 the temperature distribution in the receiver according to FIGS. 10 to 11b in accordance with a simulation FIG. 13 the steps of an operating method according to the invention for a receiver, and FIG. 14 the steps of a production method for a receiver according to the invention.

FIG. 1a shows an experimental arrangement for a volumetric receiver 1 according to the REFOS project with a heating area 2 for heating a heat-transporting medium, here, air, which has an opening 3 formed as a quartz window for the radiation of the sun or sunlight 4 and an absorber 5 absorbing this radiation 4 arranged in the path of the incidental radiation 4 behind the quartz window 3. A transport arrangement 6 for the transport of the heat-transporting medium through the heating area 2 has an inlet 7 in the embodiment shown, through which the medium arrives into the receiver 1 with an inlet temperature $T_{in}$ and an outlet 8, through which it leaves this with the outlet temperature $T_{out}$.

Via the edge ducts 9 of the transport arrangement 6, the air is guided to the front side of the receiver 1 with the inlet temperature $T_{in}$, where it arrives through suitably formed openings 10 into a distribution area 11 lying in front of the absorber 5; it is distributed and afterwards flows through the absorber 5, thereby being convectively heated by it and then going into a collection area 13 with a temperature $T_{out}$ and from there, into an outlet 8, through which it then leaves the receiver 1. The quartz window 3 is arched toward the inside so that the receiver 1 can be operated with increased pressure so that the heated air under pressure can be supplied to a downstream consumer, for example a turbine.

The absorber 5 tracking the contour of the quartz window 3 in a space saving manner and constructed as a volumetric absorber has a number of layers of a fine wire mesh, in which the sunlight 4 can deeply penetrate so that the absorber 5 heats up across its entire depth and thereby, the air flowing through it is convectively heated to $T_{out}$. As mentioned above, a conventional absorber in other embodiments consisting of an open-porous ceramic foam or another arrangement with a very large surface in comparison to the air volume located within the absorber in order to achieve the required convective heat transfer.

An insulation 12 surrounds the receiver 1, to which a secondary concentrator, which concentrates the flow of the solar radiation 4 toward the quartz window 3 and is left out in order not to overburden the figure is connected in front of its optical opening 3. In order not to overburden the figure, furthermore, a control system for the receiver 1 and the transport arrangement 6 has been left out, via which the operation of the receiver 1 and the supply/discharge of air is suitably regulated as is known to the person skilled in the art. A receiver like the REFOS receiver shown allows for an outlet temperature $T_{out}$ of 800° C. to be reached, with a ceramic absorber, a temperature of 1000° C.

FIG. 1b shows a diagram 15 with a temperature curve 16, which, in conjunction with FIG. 1a, schematically shows the temperature profile of the air flowing through the receiver 1. In Section A, a low convective heating of air from $T_{in}$ to $T_1$ (part 17 of the temperature curve 16) takes place from the inlet 7 to the end of the edge ducts 9. In Section B, a first relevant and convective heating from $T_1$ to $T_2$ (part 18 of the temperature curve 16) during the passage of air through the openings 10 in the absorber 5. In Section C, meaning in the distribution area 11, the air heats in an absorptive manner, but just a little, since air as a gas mixture contains a small amount of $CO_2$ (or another gas), for example, which absorbs in the infrared range, however, otherwise is primarily translucent for infrared radiation (part 19 of the temperature curve 16). Ultimately, in Section D, the air flows through the absorber 5, where it is convectively heated to the temperature $T_4$, which corresponds to the outlet temperature $T_{out}$ (part 20 of the temperature curve 16). In Section E, the air arrives through the collection area 13 into the outlet 8, wherein, in turn, a low absorptive temperature increase results due to the infrared-absorbing gas component. The temperature jump from $T_{in}$ to $T_{out}$ is primarily due to convection; in this way, for example, according to diagram 15, the (realistic) ration of the convective temperature increase to the absorptive temperature increase is greater than 5:1.

FIG. 2 schematically shows an exemplary embodiment of a receiver 25 according to the invention designed as a spatial receiver with a heating area 26, which has an opening 3 for the radiation of the sun, for example, a quartz window and an absorber 27, which is plate-shaped here, wherein an absorption area 28 forming a heating area is provided between the quartz window 3 and the absorber 27, which the heat-transporting medium flows through from right to left according to the drawn-in arrows, meaning against the absorber 27. In addition, the transport device 29 has inlet nozzles 30 arranged around the quartz window 3 for heat-transporting medium, which lead into the absorption area 28, and a central outlet nozzle 31 behind the absorber 27. In order not to overburden the figure, here, as is also the case in the following figures, the insulation of the receiver has been left out According to the invention, the absorber 27 is designed as a blackbody radiation arrangement, meaning, it possesses a surface 27' arranged in the path of the incidental sunlight or the incidental solar radiation 4 that absorbs this radiation and is designed in such a way that it operationally heats up due to the incidental solar radiation 4 falling on the surface 27' and then emits infrared radiation into the absorber area 28 across its surface 27'.

Thereby, the absorber 27 emits its a substantial portion of its heat power into the absorber area 28 in the form of infrared radiation, where the heat-transporting medium flowing toward it already heats up to $T_{out}$ to a great extent or predominately in an absorptive manner before it reaches it.

A real structure only radiates approximately like the ideal blackbody does. In the present, under a "blackbody radiation arrangement", it is understood that the incidental solar radiation 4 is absorbed on the surface of the absorber to the furthest extent possible (meaning primarily only penetrating into the absorber a little bit in contrast to the known volumetric absorbers) so that this surface heats up to a high temperature and, by means of this, it radiates like a blackbody into the absorber area 28 with the high temperature concerned with another frequency spectrum with relation to the solar radiation. The primary proportion of the blackbody radiation emitted into the absorber area 28 is in the infrared range at absorber 27 temperatures of up to 2000° K (or also above this), meaning, as mentioned, at lower frequencies with relation to visible light.

In other words, the absorber according to the invention is designed to be cooled via its blackbody radiation to the extent that the ratio X can be reached (for more information, please see the description below).

A complex absorber structure, in particular, being provided for volumetric receivers and being graduated across its depth, which also absorbs incidental solar radiation or radiation from the sun across its depth accordingly while this is at least partially scattered within its interior space and is increasingly absorbed after reflection has occurred a multiple of times, is thereby done without. Thereby, complex thermal problems that frequently occur in the case of such absorber structures are also done without. In addition, the simple geometry of the absorber area 28 provides a prerequisite for a flow of the heat-transporting medium flowing from the opening 3 to its opposite absorber 27, which heats continuously against the absorber. The sun rays 4 preferably fall directly (i.e., without reflection on the walls of the absorber area 28) onto the absorber 27. The flow of the heat-transporting medium and sunlight falling directly onto the absorber through the opening have a shared direction. Despite the complex thermodynamic effects prevailing during operation, it is thus possible to generate a layered heat distribution in the absorber area 28, the layers of which extend across the cross-section of the absorber area 28.

This results in the continuous heating of the heat-transporting medium towards the absorber 27, wherein its coldest area is at the opening 3 so that the loss reradiation from the opening 3 is optimally small. At the same time, the hottest area of the heat-transporting medium is at the absorber 27, meaning furthest away from the opening 3, so that its (blackbody) infrared radiation is intercepted by the layers of the heat-transporting medium located between it and the opening 3, meaning the opening 3 is not reached or is only reached to the minimum possible extent, which, in turn, increases the efficiency of the receiver according to the invention. Thanks to the heat-transporting medium flowing across the cross-section of the absorber area 28 at least broadly against the absorber 27, no propagation of the hottest layer of the medium against the opening 3 takes place due to the blackbody infrared radiation of the absorber 27 and of the adjacent region of the heat-transporting medium.

Being furthermore preferred, the absorber 27 is designed for a low level of convection to take place, meaning, for example, it can be easily flowed through without increased convective properties being of importance for the heat exchange. With that, the design for maximised convection of the flowing medium is also done without, meaning the structure necessary for a heat exchanger that is as efficient as possible along with a large surface in comparison with the flowing volume of the heat-exchanging medium, also meaning the surface is manufactured in a complex and therefore cost-intensive manner at a high level of efficiency and, during operation, results in a considerable drop in pressure of the flowing medium, which, in turn, is disadvantageous for the corresponding receiver's degree of efficiency.

On this note, it must be mentioned that a certain convective heat transfer at the absorber 27 caused by coming into contact with the heat-exchanging medium naturally cannot be avoided, in particular, in the case of the embodiment shown in FIG. 2 since this forms a wall section of the absorption area 28 there. The corresponding convective heat transfer to the heat-transporting gas is in itself welcomed, as is any heat transfer, to the extent if this does not cause any constructive effort or, for example, increase the flow resistance—accordingly, the outlet temperature $T_{out}$ should be based on absorption to a primary or predominant extent (see below for more information), thereby making a simplified construction of the receiver 25 possible. As mentioned above, the simplified construction of the absorber 27, among other things, opens up the possibility for inexpensive manufacturing (low-cost receiver for high temperatures) and also a stabler operation, for example, from a thermal point of view (temperature distribution via the absorber 27), which results in an increased level of industrial suitability of the receiver.

According to the invention, a receiver with a heating area results for heating a heat-transporting-medium, which has an opening for the radiation of the sun, and an absorber arranged in the path of the incidental radiation of the sun, thereby absorbing this solar radiation, with a transport arrangement for the transport of the medium through the heating area, wherein an absorption area for heating the heat-transporting medium is provided outside of the absorber and the absorber is designed as a low-convection blackbody radiation arrangement and the transport arrangement is designed for the transport of a gas as a heat-transporting medium.

Thereby, the absorber designed as a low-convection blackbody radiation arrangement is preferably designed for the flow-through of the heat-transporting gas and it is furthermore preferably located opposite to the optical opening 3.

Furthermore, as is shown in FIG. 2, the absorber area 28 is preferably provided between the opening 3 for the radiation of the sun and the absorber 27, wherein the ratio X is the ratio of the temperature increase ($T_3$-$T_2$) due to absorption of the radiation of the absorber 27 in this absorber area 28 to the entire temperature increase ($T_4$-$T_2$) due to the absorption and convection at the absorber 27 after the gas has gone passed this. The gas has then gone through the absorber 27 if it has either just passed through the absorber 27 and thus reaches the collection area 33 or if it has been directly removed on the side where the absorber 27 is located (for example, through openings 92''' or 93''' according to FIG. 5), wherein, naturally, in a specific embodiment, both possibilities can be provided simultaneously.

In another embodiment, which is not shown in the figure, the collection area 33, which is located on the back side of the absorber 27, is designed as another absorber area. In the case of an at least partially gas-tight absorber (see below), gas is led around the absorber to a back side of the absorber then led away from this.

Then, the heat-transporting gas, which has already been heated in an absorptive and convective manner, flows through this other absorption area and additional heats up in an absorptive and convective manner, preferably, according to the invention, at a temperature ratio X≥0.3. This ultimately allows for the radiating surface 27' to become larger, thereby optimising absorptive heat transfer.

Thereby, the heating area has two absorber areas with a shared absorber, wherein the ratio X is provided for one or for both absorber areas.

Furthermore, according to the invention, an infrared-absorbing gas or gas mixture is used as a heat-transporting medium, which absorbs in frequency bands belonging to the infrared range. For example, such gases are heteropolar gases, preferably $CO_2$, water vapour, $CH_4$, $NH_3$, CO, $SO_2$, $SO_3$, HCl, NO, and $NO_2$, or a mixture therefrom, such as a mixture of water vapour and $CO_2$. When using such gases, ultimately, a greenhouse effect, which can be used by the receiver 25 or is used, results since these gases are highly translucent for the visible light that thereby primarily reaches the absorber 27, however are only a little bit to hardly translucent for the infrared radiation of the absorber so that they heat up in an absorptive manner as regards $T_{out}$ in front of the absorber 27 to a considerable or predominate extent. Here, it must be mentioned that real gases do not absorb visible light or infrared radiation evenly across all frequencies and are not evenly transparent to these, but, above all, do so unevenly in at frequency bands specific to a respective gas. In addition, the absorption declines as the distance from the radiation source increases. By means of this, with regard to the absorption or the transparency of radiation, mention is made above of "highly translucent" or from "a little bit to hardly translucent".

It must be further mentioned that, naturally, the radiation of the sun also has a proportion of infrared frequency bands, provided that theses enter through the atmosphere to the earth's surface. Thanks to the heating area 26 being designed in such a way that this is just a little bit to hardly translucent for infrared frequencies, this proportion (which is in comparison small) contributes to heating the heat-transporting fluid directly via the absorber 27 without making any detours according to the invention, thereby being highly efficient. This is in contrast to conventional receivers, where the infrared proportion of the solar radiation primarily also heats the absorber and then is emitted to the heat-transporting fluid in a predominately convective manner.

The absorber according to the invention can be designed as a perforated plate, preferably as a double perforated plate or as a simple flat mesh structure. In the case of the perforated plate, a perforation pattern is distributed across the extent of it so that the heat-transporting gas can easily flow, however, thereby providing enough or as much of surface of the perforated plate or as much surface as possible for the absorption of the incidental solar radiation and the infrared back radiation into the absorber area. In addition, the perforation pattern can be designed for easy flow-through since the necessity of convention is no longer applicable and a low level of flow resistance is advantageous. The person skilled in the art can easily determine the perforation pattern in specific cases in an optimum manner. This also in the case with a mesh structure or a double perforated plate with two plates that are parallel to each other, wherein then the perforations of the one plate are arranged offset to each other with regard to those of another plate in such a way that, despite the low-convection passage of the heat-exchanging gas, a radiating surface of the absorber, which is as constant as possible, faces the absorption area. In this case, the gas is led through the absorber. As an alternative, the absorber can also be designed to be gas-tight, wherein then, the gas flows out of the absorber area 26 from the side, as is shown in FIG. 5 for example. Then, the gas is led past the absorber. In specific cases, the person skilled in the art can provide for a mixed form so that part of the gas flows through the absorber and part flows past it. The absorber then has an at least partially gas-tight surface and is preferably plate-shaped (a surface is fully gas-tight if the gas is led past the absorber).

A suitable material for the absorber has both a high degree of absorption of solar radiation as well as a high emissivity of infrared radiation, which—if required—can be additionally increased by suitably texturing the surface 27' with, for example, V-grooves, pyramids protruding into or out of the surface, or other radiation traps. In addition, high-temperature(change) and corrosion resistance (e.g., against oxidation due to water vapour or $CO_2$ in the case of high temperatures) are required. Suitable materials include both high-temperature ceramics such as silicon carbide (SiC), as well as fire-proof materials, which the person skilled in the art can, among other things, choose in specific cases with regard to the provided temperature range.

In a further, embodiment that is modified with respect to the arrangement in FIG. 2, which is shown schematically in FIG. 3, the inlet nozzles 30 (FIG. 2) are not arranged around the quartz window 3 but in the direction of the incidental solar radiation 4 behind the quartz window 3 or the opening for the solar radiation. Thus, the corresponding lines for the heat-transporting gas are not on the plane of the quartz window 3 but at least directly behind it, meaning not on the surface of the receiver 25 facing the incidental light. This eliminates the need for a corresponding shielding against the light, wherein the opening 3 can be measured exactly on the cross-section of the incidental concentrated light.

According to the invention, a receiver with a heating area for heating a heat-transporting medium results, which has an opening for the radiation of the sun, and an absorber arranged in the path of the incidental radiation of the sun, thereby absorbing this solar radiation, with a transport arrangement for the transport of the medium through the heating area, wherein, furthermore, an absorption area for heating the heat-transporting medium is provided, the end of which is formed by the opening for the radiation of the sun and its other end is formed by the absorber opposite to the opening in such a way that radiation from the sun entering through the opening essentially falls onto the absorber completely, and the absorber is designed as a radiation arrangement having an impact within the absorber area and the transport arrangement is designed for the transport of a gas as a heat-transporting medium, and supplies this to the absorber area in the region of the opening, however, in the direction of the incidental radiation behind the opening and discharges it out of the absorber area (only) in the region of the absorber in such a way that, during operation, the heat-transporting medium completely crosses the absorber area in a direction corresponding to the incidental solar radiation from one end with the opening to the other end with the absorber, and wherein the heat-transporting medium is primarily a gas absorbing in frequency bands belonging to the infrared range, and the absorber area interacting with the absorber is dimensioned in such a way that, during operation, the ratio X of the temperature increase $(T_3-T_2)$ of the heat-transporting gas absorbing in frequency bands belonging to the infrared range due to absorption in the absorber area to the temperature increase $(T_4-T_2)$ due to absorption and the convection at the absorber is ≥0.3.

Thereby, according to the selection of the person skilled in the art in specific cases, the receiver according to the invention can be designed in such a way that the temperature increases during the transport through the heating area due to absorption of the radiation of the absorber in such a way that the ratio X of the temperature increase $(T_3-T_2)$ to the entire temperature increase $(T_4-T_2)$ due to the absorption of the radiation of the absorber and convection at the absorber is ≥0.3, being particularly preferred however, up to ≥0.8 (for more information, see the description below).

This arrangement allows, among other things, for a stable temperature distribution to be generated during operation with a constantly increasing temperature against the absorber 27, wherein the temperature distribution in a cross-section of the absorber area also does not significantly change over time. Steadily increasing temperature against the absorber means that the layer of heat-transporting gas adjacent to the opening or to the quartz window 3 has the lowest temperature and thus generates the lowest radiative heat-radiation reflection through the quartz window 3, which contributes to the high efficiency of the receiver according to the invention. The same temperature distribution across the cross-section of the absorber area allows for the provision of the outlet nozzle 31 at an optimal location, e.g., at the location of the highest temperature of the heat-transporting medium, which must not be arranged on the longitudinal axis of the receiver or centrally, as is shown in FIG. 2. For example, in a receiver 25 arranged obliquely on a solar tower in the absorber area 28, convection currents in the heat-transporting medium can occur in such a way that the outlet nozzle is not centrally arranged but offset against the top; see also the description for FIGS. 9 and 10 below for more information on this.

In any case, the arrangement according to the invention allows for a constant stable temperature distribution in the receiver 25 with an optimally low level of back radiation via the quartz window 3. FIG. 4 shows a diagram 40 with a temperature curve 41, which, in conjunction with FIG. 2 or FIG. 3, schematically shows the temperature profile of the gas flowing through the receiver 25.

In Section F, through part 42 of the temperature curve, the heating of the infrared-absorbing heat-transporting gas from $T_{in}$ to $T_1$ is shown for the case that the infrared-absorbing gas in the embodiment of the receiver 25 shown in FIG. 2 should also be transported along the absorption area 28, as is the case with the receiver 1, to the front side as was the case with the air (FIG. 1). In Section G, a low convective heating of air from $T_1$ to $T_2$ (part 43 of temperature curve 41) takes place due to the passage of the gas through the inlet nozzles 30.

In Section H, the infrared-absorbing gas flows through the absorption area 28 and heats up in an absorptive manner due to the infrared radiation 32 of the absorber 27 (here, with the infrared proportion of the solar radiation) from $T_2$ to $T_3$ (part 44 of the temperature curve 41) before it flows through this in Section I, thereby heating in a convective manner from $T_3$ to $T_4$ (part 45 of the temperature curve 41). Ultimately, another absorptive heating of the infrared-absorbing gas in Section K from to $T_4$ to the output temperature $T_{out}$ occurs (part 46 of the temperature curve 41) well the gas is located in the collection area 33 and flows against the outlet nozzle 31. According to the invention, the temperature jump from $T_{in}$ to $T_{out}$ is primarily absorptive to a great or predominant extent.

From the representation in FIGS. 2 and 3, it occurs that the transport arrangement of the receiver preferably has an absorption area 28 in the flow direction in front of and another (here, designed as a collection area 33) absorption area in the flow direction behind the absorber 27.

The person skilled in the art determines operating parameters for the specific case at hand, generally based on the desired or required outlet temperature $T_{out}$ and the inlet temperature $T_{in}$ that is given due to the use of the heat from the receiver. Furthermore, for the specific case at hand, he chooses an appropriate infrared-absorbing gas or gas mixture and determines the flow rate in the absorption area 28 (which can, in turn, be dependent on the current solar radiation). Such operating parameters and other parameters that result in specific cases can depend on one another with the consequence that the absorptive increase of temperature from $T_2$ to $T_3$ in Section H in FIG. 3, meaning in the absorption area 28, can turn out to be greater or lower depending on the specific case at hand.

The applicant has found that the advantages according to the invention already have relevant impact at a ratio X of ≥0.3, wherein, $$X = \frac{T_3 - T_2}{T_4 - T_2}$$

meaning the ratio between the absorptive and the entire absorptive and convective heating of the heat-transporting gas indicates when the gas has flowed to an absorber 27 radiating in the infrared range and then has flowed through this (or has flowed along it to an outlet), meaning it has passed this. By means of appropriate operation with the selected parameters, in other words, by means of an appropriate design of the control system of the receiver 25, the person skilled in the art can reach the value according to the invention of X≥0.3 in specific cases.

The person skilled in the art can, as mentioned, refer the ratio X≥0.3 to the absorption of only the absorber radiation 32, 55 or to the absorption of the absorber radiation including the absorption of the infrared proportion of the solar radiation 4 running through the absorption area 28, 57 (FIGS. 2 and 4).

According to the invention, this results in a gas absorbing in the frequency bands belonging to the infrared range being provided as a heat-transporting medium. Furthermore, according to the invention, this results in an absorption area that interacts with the absorber being dimensioned in such a way that, during operation, the ratio X of the absorptive temperature increase ($T_3$-$T_2$) of a heat-transporting gas in the absorption compartment that absorbs within frequency bands belonging to the infrared range to the entire temperature increase ($T_4$-$T_2$) due to the absorption and convection at the absorber is >0.3.

Preferably, the heat-exchanging gas flows through an absorber zone (absorption area 28) against an absorber (absorber 27), wherein it is heated in an absorptive manner within the absorber zone and also in a convective manner by the absorber. A receiver can be constructed in a multilevel manner, meaning heating a heat-transporting medium step-by-step. According to the invention, at least one step is designed for absorptive/convective heating with the ratio X of ≥0.3.

If so, the heating area preferably has two absorption areas, wherein the ratio X for one or for both of the absorption areas is provided in connection with the absorber.

For a high degree of efficiency of the receiver according to the invention, it is a decisive factor that the amount of heat emitted by the absorber is absorbed in the absorption area by the heat-transporting gas to the furthest extent possible (and for example, does not penetrate the gas and deviate through the opening for the solar radiation as back radiation again from the receiver). A decisive parameter here is the absorptivity a of the heat-transporting gas, which can be measured by testing, can be calculated from spectral line values deriving from molecular-spectroscopic databases (e.g., HITEMP2010) or also can approximately be determined from emissivity diagrams according to Hottel's rule. If, under the current operating conditions, the receiver in an embodiment has a distance H between the absorber and the opening in such a way that the heat power of the heat-transporting gas emitted by the absorber is absorbed within this region at 60% or more, a good degree of efficiency of the receiver already results, which is construed for the absorption of the absorber heat. It is particularly preferred if a height in the mentioned region is such that 80% or more, particularly preferred 90% or more of the emitted heat power of the absorber is absorbed by the heat-transporting gas.

Here, it must be mentioned that the absorber area surely has an opening for the radiation of the sun until an absorber acting within it via its blackbody radiation, wherein, according to FIGS. 2 to 4, the absorber preferably lies opposite to the opening. In principle, the absorber area can also not be cylindrical, but be shaped in any way, for example, with inset sidewalls so that the opening is smaller than the absorber surface, which is favourable with regard to the undesired back radiation. In such a case, the radiation is bundled in the opening by a concentrator and diverges after the opening in such a way that the entire absorber surface, which is larger, is illuminated. Then, the absorber area possibly does not have such a height under the inset walls but under the opening so that an absorption exists at the aforementioned degree in the region concerned (where this level is present).

Since the absorptivity is dependent on the type of gas, its pressure and the temperature of the radiating absorber surface and the temperature of the gas self (Hottel's rule), the person skilled in the art can determine the height depending on the parameters determining the absorption: as mentioned, this includes the type of gas, it's operating pressure, it's temperature and the temperature of the absorber surface during operation, which determines an operational state of the receiver to this extent.

A preferred embodiment of the receiver according to the invention results, where the absorption area has a height above the absorber in such a way that, during an operational state of the receiver in this region 60% or more, preferably 80% or more, quite particularly preferred 90% or more of the heat power emitted by the absorber is absorbed by the heat-transporting gas.

FIG. 5 shows another embodiment of the receiver according to the invention. A section through a receiver 50 is shown, which corresponds to the receiver 25 in FIG. 2. wherein, however, the absorber 51 with its absorbing surface 51' facing the optical opening 3 has a preferably plate-shaped section 54 projecting into the absorber area 57, which extends against the opening 3 in the middle of the absorber area 57 and which is primarily aligned in parallel to the flow direction of the infrared-absorbing heat-exchanging gas indicated by the arrows drawn in. Section 54 primarily absorbs infrared radiation emitted by the absorbing surface 51' provided that this has not been absorbed by the gas flowing along it, meaning in particular, radiation in those frequency bands, for which the gas is less absorptive. By means of this, it heats up and is, in turn a blackbody radiation arrangement, which radiates in the entire frequency spectrum corresponding to the temperature of the section 54 and the gas transporting the heat flowing by is heated in an absorptive manner. An improved use of those frequencies of the radiation 55 result, which are absorbed by the gas only slightly since these frequencies introduce heat into section 54, which then, in turn, radiates at all (infrared) frequencies. The section 54 represents a secondary absorber.

Such an arrangement can be designed in greater dimensions, for example, with a diameter of the absorber surface 51' being 15.96 m and a length of the absorption area 53 (absorber surface 51' to the optical opening 3) being 15.96 m. Then, the receiver 50 is suitable to absorb the flow of a greater number (or all) of heliostats of a tower power station. This results in the receiver 50 having an absorption area 57 and the absorber 51 with a section or a secondary absorber 54 projecting into this area, which is preferably plate-shaped.

In another embodiment, which is not shown in the figure, for example, a wall, which is translucent for the visible spectrum of the sunlight (borosilicate glass) can be provided as a secondary absorber, which is arranged approximately in the centre between the absorber surface 51' and the optical opening 3 (FIG. 4) parallel to the absorber surface 51' and has passages, for example in the type of a perforated plate, for the heat-transporting gas. In turn, the glass wall is heated by the infrared radiation of the absorber surface 51' and by its frequency proportions, which have not been yet absorbed by the gas and radiates in itself like a blackbody in both directions, namely both against the optical opening and also against the absorber. The person skilled in the art can design the glass plate in specific cases so that the ratio X of ≥0.3 is achieved for the section of the absorption area between the glass plate and the optical opening and the last plate assigned to it and also for the section of the absorption area between the glass plate and the absorber with the absorber assigned to it. According to the invention, a receiver results, which has a secondary absorber designed as a blackbody radiation arrangement with reduced convection in an absorption area lying in front of the absorber, which is arranged and designed in such a way that it can be heated by the infrared radiation of the absorber.

FIG. 6 schematically shows a cross-section through another embodiment of the receiver like the one in FIG. 2. The sun rays 4 fall through a window made of quartz glass 3 for example onto the absorber 27, the radiating surface 27' of which heats the gas flowing within the absorption area 26, wherein its temperature increases from the window 3 to the absorber 27. Accordingly, the gas can be removed via openings 91 to 91''' in the cylindrical wall of the receiver 90 at various predetermined temperatures and at temperatures below the operating temperature of the heat-transporting fluid, wherein, however, the main flow of the heat-transporting fluid is still removed only in the region of the absorber from the absorption area 26 at operating temperature. The arrows show the flow direction of the heat-transporting gas, wherein the arrows are drawn in longer at the openings 91 to 91''' according to the increasing temperature. As an alternative or together with the openings 91 to 91''', a line 93 projecting into the absorption area 26 for the gas can be provided, which then feeds gas at temperatures that are predominant at the location of the openings 92 to 92''' via openings 92 to 92'''. Above all, this is favourable if a downstream process carried out at different temperature levels is provided with heat by the receiver 90. Then, the transporting gas also at various temperatures can be led back to the receiver by this process so that, being furthermore preferable, other supply lines for the heat-transporting gas into the absorption area 26 of the receiver 90 are provided in the area of the openings 91 to 91''' and 92 to 92''' (which have been omitted in order to not overburden the figure).

A receiver results, where the transport arrangement has one or a plurality of lines 91 to 91''' and 92 to 92''' connected to an absorber area 26 for heat-transporting gas, which are arranged in such a way that partially heated gas is removed from the absorber area 26 and/or partially heated gas can be supplied to a location, at which the temperature of the gas in the absorber area 26 substantially corresponds to the temperature of the supplied partially heated gas.

Such supply and discharge lines for partially heated gas can be provided at an absorptive receiver according to the invention without its layout, especially that of the absorber 27, having to be modified. They lines can also be used or made inoperative without requiring a constructive modification due to the various heat transfer.

The applicant has found that a temperature ratio X≥0.5 is especially favourable if the partially heated gas is used, for example, when the partially heated gas is at a range of 1400 K, meaning at half the temperature difference, at an inlet temperature $T_{in}$ of 1000 K and an outlet temperature $T_{out}$ of 1800 K: the temperature layer T=1400 K is still at a purely absorptive range in the absorber area 26 and can be reached easily accordingly, in FIG. 5 through the openings 91 to 91'' and 92 to 92'''.

FIGS. 7a and 7b as well as 8a and 8b show various operating parameters in a receiver according to FIG. 2 in accordance with a mathematical modelling of the receiver 25 in FIG. 2 of the applicant. The system has been modelled with the most precise method known today, namely "Spectral line-by-line (LBL) photon Monte Carlo raytracing", wherein the absorption coefficients originate from the HITEMP 2010 Spectroscopic Database. A receiver is modelled, the absorption area of which has a diameter of 15.96 m and a height of 15.96 m and the opening 3 has a diameter of 11.28 m. A surface of the absorbing surface 27' of 200 $m^2$ and a surface of the opening 3 of 100 $m^2$ results from this. As a heat-transporting medium, water vapour was adopted at a pressure of 1 bar, without a window in the opening 3. The radiation flux at the opening 3 is 1,200 $kW/m^2$ and at the absorbing surface of 27', it is 600 kW/m² (which has twice the surface compared to the opening 3). The absorbing surface 27' was adopted as a radiating blackbody, and, in contrast to FIG. 2, taken with a continuous flat and smooth surface so that the heat-transporting medium removed laterally out of the absorber area 26 through openings 91''' at the height of the absorber 27 like in accordance with FIG. 5.

Based on the diagrams 60 and 65, FIGS. 7a and 7b show the temperature profile during operation of the receiver 20 (FIG. 2) along its longitudinal axis, starting from the opening 3: on the vertical axis, the temperature in Kelvin is ablated, on the horizontal axis, the distance from the opening 3. The diagram 60, FIG. 6a, shows a process with an inlet temperature $T_{in}$ of 1,000 K and an outlet temperature $T_{out}$ of 1400 K. The diagram 65, FIG. 6b, also shows a process with an inlet temperature $T_{in}$ of 1,000 K, however an outlet temperature $T_{out}$ of 1,800 K.

Due to the walls heating during operation, a temperature distribution within the heat-transporting medium (here water vapour) with an elevated temperature at the edge of the absorber area 26 results so that the highest temperatures are present (on the wall) (temperature curves 61 and 66) at a certain cross-section within the absorber area 26 on the edge and the lowest temperatures (temperature curve 62 and 67) are present in the middle at the location of the axis of the cylindrical absorber area 26. The temperature curves 63 and 68 show the average temperature of the water vapour in the respective cross-section of the absorber area 26.

FIGS. 7a and 7b show the possible design of such receiver in accordance with FIG. 6 in addition to a proof-of-concept for an absorptive receiver in accordance with FIGS. 2 and 3.

Figure 8A:
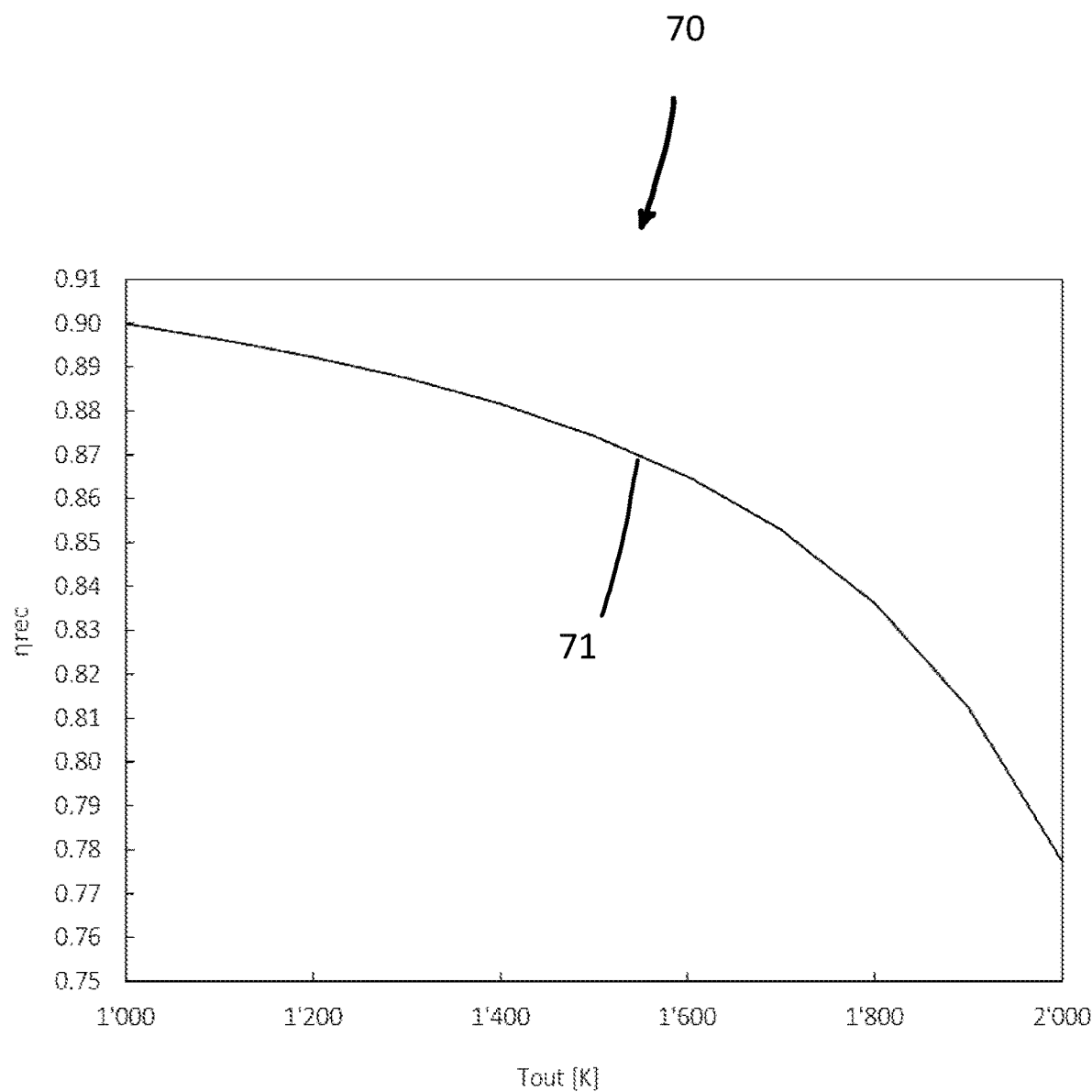

FIG. 8a shows a diagram 70 for the degree of efficiency of the receiver 20 (FIG. 2). On the horizontal axis, the outlet temperature $T_{out}$ is ablated, wherein a constant inlet temperature $T_{in}$ of 1,000 K is assumed. The curve 71 shows the degree of efficiency of the receiver 20 depending on the outlet temperature $T_{out}$. The reduction of the degree of efficiency toward higher temperatures $T_{out}$ can be explained by the elevated (loss) back radiation out of the opening 3 caused by the higher temperatures—despite the constant inlet temperature $T_{in}$ of 1,000 K since a proportion of the back radiation comes from interior space of the absorber area (with elevated temperatures). Accordingly, the concept of absorptive receiver has a degree of efficiency that is equal to convention convective receivers or a degree of efficiency that is even better with an increasing outlet temperature $T_{out}$.

Figure 8B:
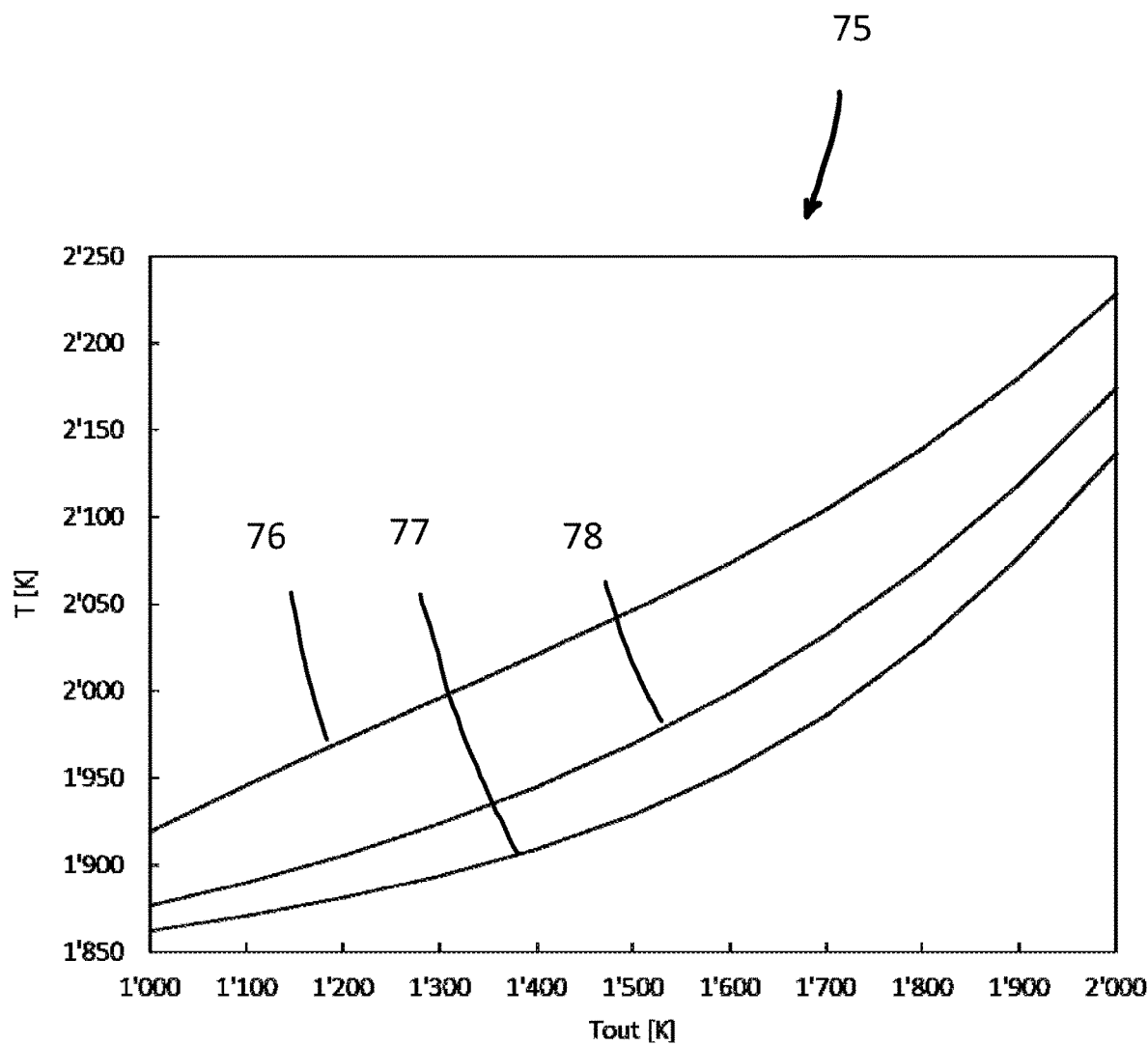

FIG. 8b shows a diagram of 75 for the temperature of the absorbing surface 27' depending on the outlet temperature $T_{out}$. In turn, a temperature distribution exists with higher edge temperatures and a minimal temperature at the location of the axis of the cylindrical absorber area 26: Curve 76 shows the temperature at the edge of the absorbing surface 27' and Curve 77 shows the temperature in the middle. Curve 78 shows their average temperature. The temperature difference with a higher $T_{out}$ becoming smaller with relation to the absorbing surface 27' can be explained by the energy emission of the blackbody increasing to the fourth power of its temperature—with a relatively small temperature increase (here, by 300 K), the heat-transporting medium is heated to a massively higher extent (here, by 1,000K). The concept of absorptive receiver therefore has considerable flexibility with regard to the provided temperature $T_{out}$: an absorber suitable for high temperatures can be equally used for different temperatures $T_{out}$, which is not the case with convective absorbers of the most recent background art and the concept of the absorptive low-cost-high-temperature receiver.

According to the modelling used, the conditions shown in FIGS. 8a, b and 8a, b also applied to a receiver 20 (FIG. 2) with smaller dimensions, however with elevated pressure within the heat-transporting medium.

Figure 8C:
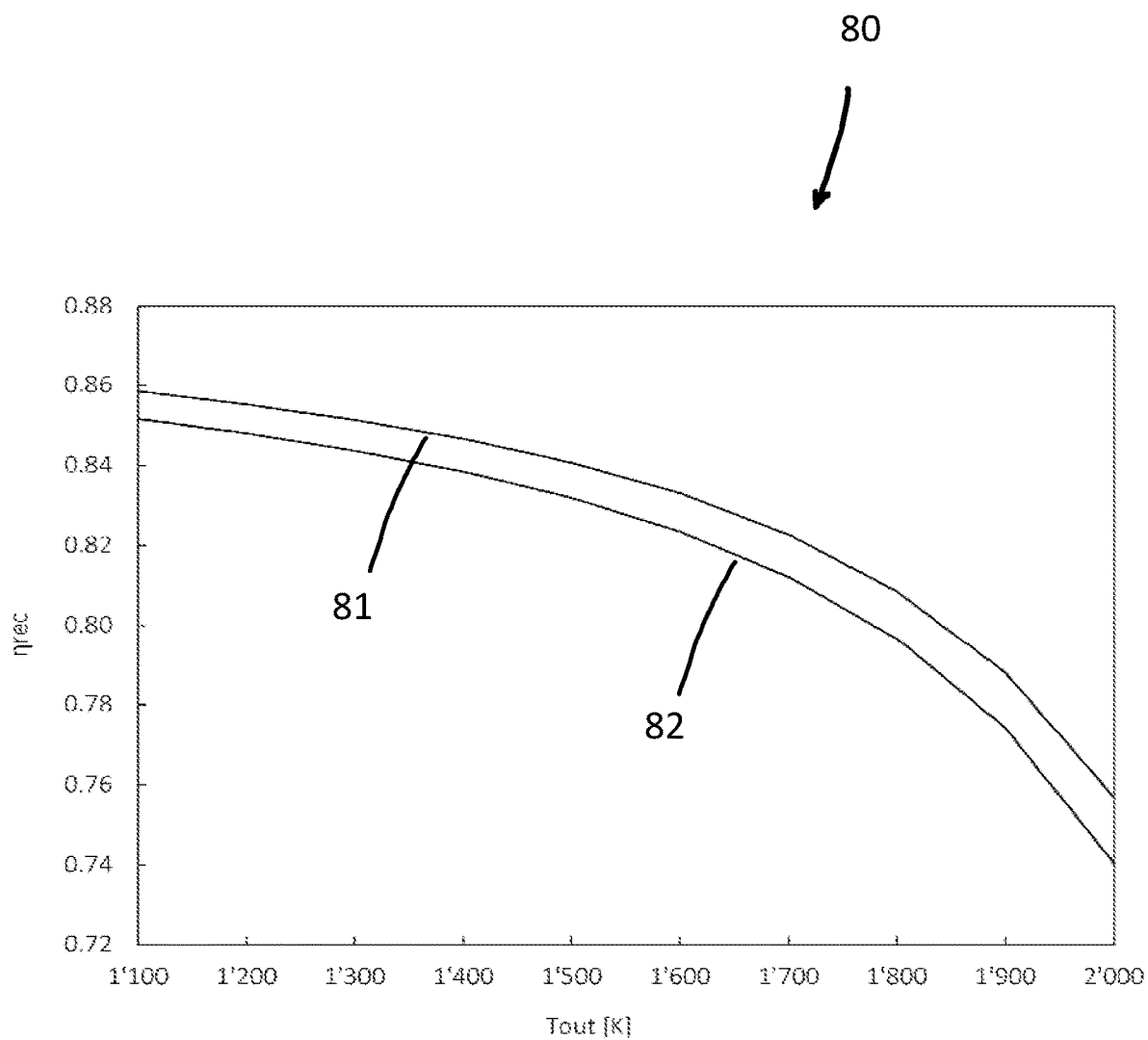

FIG. 8c shows a diagram 80 for the degree of efficiency of the receiver 20 (FIG. 2), however with a window in the opening 3 and for various dimensions. The efficiency for the large dimensions of the receiver 20 is evident in accordance with the description for FIGS. 6a,b and 7a,b, see curve 82. Furthermore, the degree of efficiency for small dimensions (diameter and height of the absorber area 26=1.596 m, diameter of the window in the opening 3=1.128, corresponding to 1 m²) is apparent with a pressure within the heat-transporting gas of 10 bar, see curve 81. The slightly smaller degree of efficiency with relation to FIG. 7a can be explained by the reduced flow on the absorbing surface of 554.4 kW/m² instead of 600 kW/m² due to the window.

The diagrams in accordance with FIGS. 8a to c also apply to a receiver in accordance with FIG. 3.

In FIG. 3, the receiver 100 is shown with an axis 103, which is arranged vertically, wherein then the radiation of a heliostat field via the mirror arranged in the solar tower is directed vertically downwards onto the receiver 100 located near the ground; such an arrangement is known to the person skilled in the art as a "beam-down". (Conversely, the radiation of the heliostat field can also be directed vertically upwards via mirrors or through the heliostats themselves, wherein the receiver 100 is then located at the top of the solar tower.) In contrast to the embodiment according to FIG. 2, the heat-transporting medium is now, as mentioned above, not supplied to the absorber area 28 through nozzles or openings 30 on the plane of the opening (or a window) 3 for the radiation 4 of the sun but in the direction of the incidental radiation 4 behind the opening 3 for this radiation. This ensures that the corresponding supply lines 102 for heat-transporting medium from the opening 3 can be arranged further away and, at the same time, can be easily protected. The nozzles or feeding points 30 near the opening 3 for heat-transporting medium in accordance with FIG. 2 are disadvantageously endangered, in particular, in the case of a flawless orientation of the heliostats endangered and must be elaborately designed for a very high energy input to withstand high temperatures which contradicts the simplicity of the receiver according to the invention with regard to constructive effort.

Furthermore, the receiver 100 orientated in a vertically downward manner particular is such that the flow of the fluid transported through the absorber area 28 forms quite evenly, thereby resulting in a clear temperature layering across the height of the absorber area 28. In the case of a "beam-down" arrangement, it may be useful in the specific case at hand to also provide a swirl in the fluid in accordance with FIGS. 9 to 12 in addition to a sufficiently high flow rate of the heat-transporting fluid against the absorber.

As mentioned above, in a solar tower power plant, for example, constructional designs are also used where the receiver is arranged at the top of the tower and orientated obliquely downwards to directly absorb the radiation of the heliostat field. Due to the oblique orientation, correspondingly obliquely arranged temperature layers result, which can generate a convection flow in the heat-transporting fluid, which disturbs the temperature layering and thus also the desired uniform temperature in the area of the absorber 27.

According to the invention, therefore, in accordance with the embodiment according to FIG. 9, the heat-transporting fluid is supplied tangentially to its transport direction given in the absorber area 28 so that the gas supplied in the heating area and in the absorber area 28 in the transport direction against the absorber 27 additionally rotates around an axis 103 parallel to the transport direction.

FIG. 9 schematically shows a view on an obliquely arranged receiver 110 on the side of its opening 3 for the radiation of the sun, wherein supply lines 104 arranged tangentially to the axis 103 for the heat-transporting medium are visible, which generate a rotation of the medium or a swirl in the medium flowing against the absorber 27. The absorber 27 is visible through the opening or the quartz window 3 in the figure, wherein, in order not to overburden the figure, the flow path of the medium through the absorber (or passing by it) is not drawn in but only an outlet nozzle 106 is dashed in, from which the medium exits the receiver 110. The outlet nozzle is preferably arranged somewhat eccentrically offset upwards, which, in combination with the swirl of the flowing medium results in a stable temperature in the heat-transporting medium at the location of the outlet nozzle 106.

As a result, the transport arrangement is preferably designed in such a way that, during operation, the heat-transporting medium has at least partially a swirl around an axis 127 of the absorber area parallel to the transport direction when crossing the absorber area taking place in the transport direction, wherein the transport arrangement preferably has inlet openings for the medium provided at the absorber area, which are tangentially orientated opposite the axis of the absorber area in the same swirl-flow direction.

It should be noted at this point that the rotation of the flow or the swirl can also be generated by guide plates in the absorber area 28, which, thanks to the defined temperature layering, is preferably implemented in its cold region, thereby only marginally increasing the effort for the receiver according to the invention.

FIGS. 10 to 12 show details of a receiver 120, which is designed for high efficiency even in the case of oblique or horizontal positioning. FIG. 10 shows a view from the outside of the receiver 120; FIGS. 11a and b show a cross-section through this, and FIG. 12 shows the layered temperature distribution in its absorption area 28 according to a simulation of the applicant. In turn, in order not to overburden the figures, the insulation of the receiver 120 as well as its supporting, external structure, which the person skilled in the art can easily design, is omitted in the specific case at hand.

FIG. 10 shows the receiver 120, with its absorption area 28, the collection area 33 and the outlet nozzle 121 (see also the illustration of FIG. 2). Furthermore, a supply arrangement 122 for cold ($T_{in}$) heat-transporting fluid, which is a component of the transport arrangement 29 (FIG. 2) is visible. The supply arrangement 122 has an annular space 123, into which the supply lines 124 for heat-transporting fluid flow into (see arrows 125), wherein fluid having flowed into the receiver 120 via the annular space 123 crosses the absorber area 28 in a main flow direction parallel to the axis 127, heats up and ultimately exits the receiver 120 via the collection area 33 and outlet nozzle 121 again at the temperature $T_{out}$ (arrows 126). Sun rays 4 pass through an opening hidden by the annular space 123 in the figure or through a window 3 in the absorption area 28 up to the inner side of the collection area 33, whose inner wall is formed as an absorber for the solar radiation in the embodiment shown. As mentioned in the description for FIG. 9, in the embodiment shown, the outlet nozzle 121 is arranged in an upwardly offset manner.

FIG. 11a shows the annular space 123 in a cross-sectional view, wherein the sectional plane, in turn, passes through a longitudinal axis 127 passing through the absorption area 28 and the supply lines 124 (see also FIG. 10). In this case, the annular space 123 is shown to scale, as well as the connecting region of the absorption area 28 as well as the position of the opening 3 or a window 3 for the radiation of the sun. As mentioned above, however, the insulation and the supporting structure are omitted, here in particular, the one for the window 3 and the annular space 123. Furthermore, the supply lines 124 arranged upstream or on the inlet side for the heat-transporting fluid are shown. Downstream or on the outlet side, the annular space 123 divides into an outer annular duct 132 with an annular outlet slot 130 and an inner annular duct 133 with an annular outlet slot 131. The outer duct 132 runs coaxially to axis 127 of the absorption area 28 and adjacent to its wall 138, the inner duct 133 has a cone stump-like configuration and is directed obliquely against the interior of the absorption area 28. Thus, in the region of the wall 138, zones with reduced flow towards the absorber are formed only in a reduced manner or to an extent that is no longer relevant, wherein, despite the somewhat hotter walls (see the diagrams in FIGS. 7 and 8), ultimately, a homogeneous temperature layer results in front of the absorber across the cross-section of the absorption area 28 (see also FIG. 12). Being particularly preferred, therefore, a flow component runs from the outer duct 132 parallel to the wall 138, preferably its angle to the wall 130 is less than or equal to 5 degrees. A positive effect can still be achieved at an angle less than 10 degrees or 15 degrees.

The annular ducts 132, 133 are provided with guide plates 134, 135 (see FIG. 11b) so that openings for the heat-transporting medium are formed in the outlet slots 130, 131 and give it additionally a flow component that is tangential to the axis 127. Thus, it enters in the absorption area 28 with a directed flow and has a (swirl) flow direction tangential to the axis 127 in addition to the main flow direction parallel to the axis 127. This results in the spiral-shaped flow lines 136 and 137, which are exemplified in the figure. As a result, a disturbance of the temperature layering in the receiver 120 can be suppressed by, for example, temperature-related convection currents, in particular, i the case of an oblique or horizontal orientation.

FIG. 11b shows an enlarged section from FIG. 11a to clarify the conditions at hand. In particular the guide plates 134' to 134''' and the components of the directed flow 136, namely the one in the direction of the main flow 141 and the tangential component 142 are evident.

It results a receiver in which the transport arrangement in the absorber area has openings leading into the absorption area for the heat-transporting medium, which are arranged adjacent to a wall 138 of the absorption area 28 and which generate a flow component of the fluid flowing into the absorption area 28 in the main flow direction with an inclination with respect to the wall 138 of less than 15 degrees, preferably less than or equal to 5 degrees. According to the applicant's findings, such small angles are necessary to avoid reduced flow rate against the absorber in the area of the wall 138, which is relevant for the efficiency of the absorber.

Furthermore, a receiver results, in which the transport arrangement in the absorber area has openings leading into the absorption area for the heat-transporting medium, which generates a tangential flow component of the fluid flowing into the absorption area 28 that is tangential to an axis 127 of the absorption area 28.

Finally, a method for the operation of a receiver arises, in which the infrared-absorbing gas is set into rotation in an absorption area (28, 53) of the heating area (26) in such a way that it has a swirl around an axis (127) running in the transport direction or the main flow direction in the absorption area.

FIG. 12 shows the temperature distribution in accordance with a CFD simulation of the applicant in the absorption area 28 of receiver 120 with the following boundary conditions:
Diameter of absorption area 0.8 m, pressure in absorption area=1 bar
$T_{in}$=800° K, mass flow of heat-transporting fluid=0.045 kg/s
Solar radiation power through the transparent opening 3=250 kW, diameter of the opening: 0.6 m
Heat-transporting fluid: steam
Spectral radiation behaviour of water vapour modelled with weighted sum of gray gases (WSGG) model and radiation solved using the discrete ordinates (DO) method
Black walls, $\varepsilon_{wall}$=1
Gravity facing vertically downwards (horizontal receiver)
Angle of the fluid flowing into the absorption area: 45 degrees The angle of the inflowing fluid in the annular duct 132 is the angle between the directed flow 136 and the direction of the main flow 141 in FIG. 11b. The annular duct 133 has, as mentioned above, a cone-stump-like configuration, i.e., its downstream end is circular. The angle of the fluid flowing from it into the absorption area is analogous to the angle of its flow direction to a tangent to this circle.

For the simulation, a simplified geometry has been assumed for the simulation in the area between the optical opening 3 and the walls 138 of the absorption area 28: the intermediate space between the outlet slots 130 and 131 (FIGS. 11a and b) is replaced by a cone stump-shaped wall area 150.

The simulation results in an outlet temperature $T_{out}$ of 1,862° K as well as the temperature layering shown in the figure, which is represented by the temperature curves 140 to 145. The temperature 1420° K corresponds to curve 140; temperature 1533° K corresponds to temperature 141, 1589° K corresponds to curve 142; 1645° K corresponds to curve 143, 1702° K corresponds to curve 144; and 1870° K corresponds to curves 145.

It turns out that, despite the complex thermodynamic conditions, among other things, due to the hot of the radiation of the absorber 27 with heated wall 138 and the complex flow-technical conditions, among other things, due to the convection flow generated by the temperature differences and the gravitation, there is a temperature layering, in the case of which the temperature from the opening 3 to the outlet nozzle 121 constantly increases, with the consequence that the efficiency-reducing back radiation can be minimized via the opening 3. It should be noted that the person skilled in the art can determine the direction of the inflow or the swirl or the rotation of the fluid in the absorption area around an axis running through this in an appropriate manner for the specific case at hand, as well as the location of the outlet nozzle (centrically according to FIGS. 2 and 3 to 6 or offset according to FIGS. 9 and 10). If an optimal swirl in context with the other parameters (for example, those of the simulation above) can be generated, the outlet nozzle can be arranged centrically even in the case of a horizontal orientation. Conversely, the combination of a comparatively weak or non-ideal swirl with an offset position of the outlet nozzle can generate the desired temperature layering.

Therefore, according to the knowledge of the applicant, the dimensions of the receiver 20 and all of the embodiments of the absorptive receiver according to the invention can be easily scaled, wherein the pressure must be increased at the same ratio for a comparably high degree of efficiency or comparable temperature conditions in the case of decreasing the dimensions, here, for example, in the case of a reduction by the factor 10, the pressure grows by the factor 10. However, it seems that the degree of efficiency tends to increase slightly disproportionately as the pressure in the heat-transporting gas increases. The conditions for a pressure of 10 bar are shown in FIG. 7c. In specific cases, the person skilled in the art can provide the overpressure at a range between 2 and 20 bar, particularly preferred between 5 and 15 bar and quite particularly preferred, of 10 bar as mentioned in the above.

In the case of simulated embodiments according to FIGS. 3 to 10, X is at a range >0.9 since the convection on the flat and smooth absorbing surface is very little. It is worth noting that convection generally cools the absorber somewhat and is therefore suitable for decreasing the losses causing a reduction in the degree of efficiency due to back radiation out of the opening 3, meaning to increase the degree of efficiency of the receiver. However, increased convection leads to increased pressure losses in the flowing gas (which, in turn, lowers the degree of efficiency) as well as resulting in an increase effort for the construction of the absorber. In particular cases, the person skilled in the art can determine the optimal ratio between absorption and convection, meaning a specified value for $$X = \frac{T_3 - T_2}{T_4 - T_2}$$

(see the description of FIG. 4) at a range $X \geq 0.3$.

According to the knowledge of the applicant, as mentioned, already a value of X=0.3 leads to a simpler design of the receiver according to the invention with a degree of efficiency, which corresponds to that of the known receivers designed according to the principle of convection (or is higher).

Since high absorber temperatures, but also of the sidewalls of the absorption area are favourable for the most intensive blackbody radiation as possible into the absorption area, cooling means of all kinds, in particular, cooling ducts, as provided for in receivers according to the state of the art, are omitted—such as either cooling ducts in the walls or the cooling ducts in the absorber ensuring convection. A receiver results where the walls of the absorption area and/or of the absorber are free of cooling means, in particular cooling ducts. Of course, cooling means for an extraordinary operating condition of the receiver, such as emergency cooling systems in the event of malfunctions, which do not correspond to the intended operation according to the nature of the matter, are not included here. Therefore, a receiver results where the walls of the absorption area and/or of the absorber are free of cooling means for intended operation.

In a further embodiment not shown in the figures, the absorber is arranged opposite the optical opening 3 the same way the receiver 25 (FIG. 2) is and forms a wall area of the absorption area 28 (FIG. 2). In contrast to the receiver 25, the absorber is, however, not provided with cross-flow openings for the heat-transporting medium but designed to be at least partially gas-tight for this so that the heated gas radially flows out of the absorption area at the height of the absorber. By means of this, the construction of the absorber is once again simplified; the ratio X can be increased to a higher value than 0.3.

By optimising the embodiment in accordance with FIG. 2, or by means of a combination of this embodiment with other described features (an additional section 54 of the absorber 51 according to FIG. 4, glass plate in accordance with the embodiment not shown in the figures, etc.), the person skilled in the art can increase the value of the ratio X from ≥0.3 to ≥0.4 and ≥0.5 or ≥0.6 or ≥0.7 or even to ≥0.8.

FIG. 13 shows the steps of a method for the operation of a preferably spatial receiver according to the present invention. At a first step 80, a suitable receiver is selected, for example, with a structure in accordance with FIG. 2, which has an absorber that can be heated by sunlight, against which a gaseous heat-transporting medium is led by a transport device in order to heat it through the absorber for the heat transport.

At a second step 81, a gas absorbing within the infrared range is selected as a heat-transporting gas, in particular a heteropolar gas or one of the gases $CO_2$, water vapour, $CH_4$, $NH_3$, CO, $SO_2$, $SO_3$, HCl, NO, and $NO_2$ (or also a mixture of these gases) in order to absorb blackbody radiation of the absorber by absorption of the gas transported against the absorber already in front of the absorber, thereby heating the heat-transporting medium.

At a third step 82, the operating parameters of the receiver are set in such a way that, during operation of the receiver, the ratio X of the temperature increase of the heat-transporting medium by means of absorption in front of the absorber to the temperature increase by absorption and convection at the absorber is ≥0.3.

At a fourth step 83, the receiver is set into operation and run with the parameter X≥0.3.

A method results to operate a receiver with a heating area for heating a heat-transporting medium, and a transport arrangement for the transport of the medium through the heating area, wherein, in the heating area, an opening is provided for the radiation of the sun and an absorber is provided in the path of the incidental radiation of the sun, thereby absorbing this, and wherein a gas absorbing within frequency bands belonging to the infrared range is provided as a heat-transporting medium, which is supplied to the heating area at its one end comprising the opening and is guided through this against the other end of the heating area comprising the absorber, thereby being initially discharged from this there, and the operating parameters of the receiver are set in such a way and the gas is selected in such a way that its temperature during transport through the heating area (to the absorber) increases due to absorption of radiation in such a way that the ratio X of the temperature increase ($T_3$-$T_2$) due to the absorption of radiation to the entire temperature increase ($T_4$-$T_2$) due to the absorption and convection at the absorber is ≥0.3.

In an embodiment, the ratio X≥0.3 is referred to the absorption of only the absorber radiation so that the temperature during transport through the heating area by means of absorption of the radiation of the absorber increases in such a way that the ratio X of the temperature increase (T3-T2) due to the absorption of radiation of the absorber to the entire temperature increase (T4-T2) due to the absorption of the radiation of the absorber and convection at the absorber is ≥0.3.

The person skilled in the art can refer the ratio X≥0.3 to the absorption of only the absorber radiation 32, 55 or to the absorption of the absorber radiation including the absorption of the infrared proportion of the solar radiation 4 running through the absorption area 28, 57 (FIGS. 2 and 4).

Preferably, a heteropolar gas is selected as an absorbing gas, furthermore preferred $CO_2$, water vapour, $CH_4$ or a mixture of these gases.

The person skilled in the art can then modify the method according to the invention in such a way that the ratio X is the same or larger than 0.4, or 0.5 or preferably is the same or larger than 0.7, particularly preferred, being the same or larger than 0.8.

In an embodiment, the method according to the invention can be designed in such a way that the gas is led through the absorber. As an alternative, it can be provided that the gas is led past the absorber.

FIG. 14 shows the steps of the production method according to the invention for a receiver, for example, according to FIGS. 2 to 4, wherein, at step 87, the absorber is designed as a blackbody radiation arrangement with a reduced convection and accordingly, an absorber area interacting with the absorber is provided in order to be able to transfer the heat to the heat-transporting gas. Afterwards, at step 88, a gas absorbing within the frequency bands belonging to the infrared range is provided as a heat-transporting gas together with the dimensions of the absorber area in such a way that a predetermined operational state of the receiver can be defined, in which the temperature increase of the heat-transporting gas due to absorption of (the blackbody (infrared) radiation of the absorber and the infrared proportions of the sun to the temperature increase due to absorption and convection at the absorber is at a ratio of X≥0.3.

A production method results for a receiver with a heating area for heating a heat-transporting medium and a transport arrangement for the transport of the medium through the heating area, wherein, within the heating area, and optical opening for sunlight is provided and an absorber absorbing the sunlight arranged within the path of the incidental sunlight is provided, characterized in that the absorber is designed as a blackbody radiation arrangement with reduced convection and an absorber area interacting with the absorber is provided, a gas absorbing within frequency bands belonging to the infrared range is provided as a heat-transporting medium in such a way and the absorber area is dimensioned in such a way that, during a predetermined operational state of the receiver, the temperature of the heat-transporting medium flowing operatively through the absorption area increases due to the absorption of the infrared radiation of the absorber (and the infrared proportion of the solar radiation) in such a way that the ratio X of the temperature increase ($T_3$-$T_2$) due to absorption in the absorber area to the overall temperature increase ($T_4$-$T_2$) due to the absorption and convection at the absorber is ≥0.3.

Preferably, a heteropolar gas is selected as a gas, furthermore preferred $CO_2$, water vapour, $CH_4$, $NH_3$, CO, $SO_2$, $SO_3$, HCl, NO, and $NO_2$ or a mixture of these gases.

Thereby, furthermore, in an embodiment of the invention, the ratio X is set to be the same or greater than 0.4, preferably is 0.5, particularly preferred is 0.6, quite preferred is 0.7 and the most preferred is 0.8.

Ultimately, in another embodiment, a secondary absorber can be provided in the absorber area designed as a blackbody radiation arrangement with reduced convection and further preferred, the receiver can be designed as a spatial receiver.

The invention claimed is:

1. Method to operate a receiver with a heating area for heating a heat-transporting medium, and a transport arrangement for the transport of the medium through the heating area, wherein, in the heating area, an opening is provided for the radiation of the sun and an absorber is provided in the path of the incidental radiation of the sun, thereby absorbing this, characterized in that a heteropolar gas absorbing within frequency bands belonging to the infrared range is provided as a heat-transporting medium, which is supplied to the heating area in the flow direction behind the opening, and is led in this in a transport direction shared with the direction with the solar radiation falling through the opening directly onto the absorber from its one end having the opening towards its other end comprising the absorber and lying opposite to the opening, and is initially discharged from the heating area there, and that the operating parameters of the receiver are set in such a way in the heteropolar gas is selected in such a way that its temperature during transport through the heating area increases due to absorption of radiation in such a way that the ratio x of the temperature increase ($T_3$-$T_2$) due to the absorption of radiation to the entire temperature increase ($T_4$-$T_2$) due to the absorption and convection at the absorber is ≥0.3.

2. Method according to claim 1, wherein the temperature increases during the transport through the heating area due to absorption of the radiation of the absorber in such a way that the ratio x of the temperature increase ($T_3$-$T_2$) due to absorption of radiation of the absorber to the entire temperature increase ($T_4$-$T_2$) due to the absorption of the radiation of the absorber and convection at the absorber is ≥0.3.

3. Method according to claim 1, wherein the heating area has one absorber area provided between the opening and the absorber arranged in the path of the incidental radiation of the sun and wherein the ratio x is the ratio of the temperature increase ($T_3$-$T_2$) due to absorption of the radiation of the absorber in this absorber area to the entire temperature increase ($T_4$-$T_2$) due to absorption and convection at the absorber after the gas has passed this.

4. Method according to claim 1, wherein the heating area has two absorber areas with a shared absorber, and wherein the ratio x is provided for one or for both absorber areas.

5. Method according to claim 1, wherein the ratio x is the same or greater than 0.5.

6. Method according to claim 1, wherein the gas is led through the absorber.

7. Method according to claim 1, wherein the gas is led past the absorber.

8. Method according to claim 1, wherein the gas is subjected to overpressure within the heating area.

9. Method according to claim 1, wherein gas is led around the absorber to a back side of the absorber and then led away from this.

10. Method according to claim 1, wherein gas heating due to absorption of the radiation of the absorber is removed from the absorber area as soon as it is partially heated and/or a partially heated gas is supplied to the absorber area and wherein the supply takes place within the absorber area at the respective location where the temperature in the absorber area substantially corresponds to the temperature of the partially heated gas.

11. Method according to claim 1, wherein the infrared-absorbing gas is supplied the heating area tangentially to the transport direction in such a way that gas led against the absorber in the transport area in the transport direction additionally rotates around an axis parallel to the transport direction.

12. Method according to claim 1, wherein the infrared-absorbing gas in an absorption area of the heating area is set into rotation in such a way that it has a swirl around an axis parallel to the transport direction in the absorption area.

13. Receiver for carrying out the method according to claim 1, with a heating area for heating a heat-transporting-medium, which has an opening for the radiation of the sun, and an absorber arranged in the path of the incidental radiation of the sun, thereby absorbing this solar radiation, with a transport arrangement for the transport of the medium through the heating area, characterized in that, furthermore, an absorption area for heating the heat-transporting medium is provided, the end of which is formed by the opening for the radiation of the sun and its other end is formed by the absorber lying opposite to the opening in such a way that radiation of the sun entering through the opening falls directly and essentially completely onto the absorber, and the absorber is designed as a radiation arrangement having an impact within the absorber area, and the transport arrangement is designed for the transport of a gas as a heat-transporting medium, and supplies this however to the absorber area in the region of the opening in the direction of the incidental radiation behind the opening for the radiation of the sun, and discharges it again out of the absorber area in the region of the absorber in such a way, that, during operation, the heat-transporting medium completely crosses the absorber area in a direction corresponding to the incidental solar radiation from the one end with the opening to the other end with the absorber and wherein the heat-transporting medium is primarily a gas absorbing in frequency bands belonging to the infrared range, and the absorber area interacting with the absorber is dimensioned in such a way that, during operation, the ratio x of the temperature increase ($T_3$-$T_2$) of the heat-transporting gas absorbing in frequency bands belonging to the infrared range due to absorption in the absorber area to the temperature increase ($T_4$-$T_2$) due to absorption and the convection at the absorber is ≥0.3, wherein the absorber area is preferably provided between the opening for the radiation of the sun and the absorber, wherein the ratio x is the ratio of the temperature increase ($T_3$-$T_2$) due to absorption of the radiation of the absorber in this absorber area to the entire temperature increase ($T_4$-$T_2$) due to the absorption and convection at the absorber after the gas has gone through this.

14. Receiver according to claim 13, wherein the absorber area is dimensioned in such a way that, during operation, the ratio x of the temperature increase ($T_3$-$T_2$) of the heat-transporting gas absorbing within the frequency bands belonging to the infrared range due to the absorption of the radiation of the absorber within the absorber area to the temperature increase ($T_4$-$T_2$) due to absorption of the radiation of the absorber and the convection at the absorber is ≥0.3.

15. Receiver according to claim 13, wherein the heating area has two absorber areas, that jointly share the absorber and wherein the ratio x is provided for one or for both absorber areas, wherein, preferably, connection ducts leading around the absorber connect both absorber areas to each other.

16. Receiver according to claim 13, wherein the absorber has a surface that is at least one partially gas-tight and is preferably plate-shaped.

17. Receiver according to claim 13, wherein the walls of the absorption area and/or the absorber are free of cooling means, in particular, cooling ducts.

18. Receiver according to claim 13, wherein the walls of the absorption area and/or the absorber are free of cooling means, in particular, cooling ducts, for the intended operation of the receiver.

19. Receiver according to claim 13, wherein the heat-transporting gas contains a heteropolar gas.

20. Receiver according to claim 13, wherein a secondary absorber is provided within absorption area and is designed in arranged in such a way that it can be heated by the infrared radiation of the absorber and, during operation, has an impact within the absorber area in itself via its radiation, wherein it is preferably plate-shaped and, particularly preferred, primarily does not shadow the absorber.

21. Receiver according to claim 13, wherein the transport arrangement has one or a plurality of lines connected to an absorber area for heat-transporting gas, which are arranged in such a way that partially heated gas is removed from the absorber area and/or partially heated gas can be supplied to a location, at which the temperature of the gas in the absorber area primarily corresponds to the temperature of the partially heated gas supply.

22. Receiver according to claim 13, wherein in absorber area is designed for a pressure of the gas within a range between 2 and 20 bar.

23. Receiver according to claim 13, wherein the ratio x is the same or greater than 0.5.

24. Receiver according to claim 13, wherein the transport arrangement is designed in such a way that in operation the heat-transporting medium during the transport direction passing of the absorber area at least partially has a swirl around a parallel to the transport direction axis of the absorber area, wherein the transport arrangement, preferably has inlet openings for the medium provided at the absorber area, which are tangentially orientated opposite the axis of the absorber area in the same swirl-flow direction.

25. Receiver according to claim 13, wherein the transport arrangement has openings leading into the absorber area for the heat-transporting medium, which are arranged adjacent to a wall of the absorption area and which generates a flow component of the fluid flowing into the absorption area in the main current direction at an inclination with relation to the wall of less than 15 degrees, preferably less than or equal to 10 degrees, being particularly preferred less than or equal to 5 degrees.

26. Receiver according to claim 13, wherein the transport arrangement has openings leading into the absorber area for the heat-transporting medium, which generates a flow component of the fluid flowing into the absorption area that is tangential to an axis of the absorption area.

27. A production method for a receiver with a heating area for heating a heat-transporting medium and a transport arrangement for the transport of the medium through the heating area, wherein, within the heating area, an optical opening for sunlight is provided and an absorber absorbing the sunlight arranged within the path of the incidental sunlight is provided, characterized in that the absorber is designed as a radiation arrangement and an absorber area interacting with the absorber is provided, in which the opening and the absorber lie close to one another and limit the absorber area, and a heteropolar gas absorbing within frequency bands belonging to the infrared range is guided and provided as a heat-transporting medium in the direction of the sunlight falling through the opening directly onto the absorber in such a way, and the absorber area is dimensioned in such a way that, during a predetermined operational state of the receiver, the temperature of the heat-transporting medium flowing operatively through the absorption area increases due to the absorption of the infrared radiation of the absorber in such a way that the ratio x of the temperature increase $(T_3-T_2)$ due to absorption in the absorber area to the overall temperature increase $(T_4-T_2)$ due to the absorption and convection at the absorber is $\geq 0.3$.

28. Method according to claim 27, wherein an absorber area is arranged within the path of the incidental radiation of the sun between the opening and the absorber, and the ratio x is provided as a ratio of the temperature increase $(T_3-T_2)$ due to the absorption of the radiation of the absorber within this absorber area to the entire temperature increase $(T_4-T_2)$ due to the absorption and convection at this absorber after the gas has passed this.

29. Method according to claim 27, wherein the ratio x is the same or larger than 0.4.

30. Method according to claim 27, wherein a secondary absorber (54) designed as a radiation arrangement is provided within the absorber area.

31. The method according to claim 1, wherein the heteropolar gas comprises at least one of $CO_2$, water vapour, $CH_4$, $NH_3$, CO, $SO_2$, $SO_3$, HCI, NO, and $NO_2$.

32. The method of claim 31, wherein the heteropolar gas is a mixture with water vapour and $CO_2$.

33. The production method according to claim 27, wherein the heteropolar gas comprises at least one of $CO_2$, water vapour, $CH_4$, $NH_3$, CO, $SO_2$, $SO_3$, HCI, NO, and $NO_2$.

34. The production method of claim 33, wherein the heteropolar gas is a mixture with water vapour and $CO_2$.

\* \* \* \* \*